US012795686B2

(12) United States Patent
Wang et al.

(10) Patent No.: US 12,795,686 B2
(45) Date of Patent: Nov. 10, 2026

(54) METHOD FOR CONFIGURING DOWNLINK CONTROL INFORMATION MONITORING AND TERMINAL DEVICE

(71) Applicant: SHARP KABUSHIKI KAISHA, Sakai City (JP)

(72) Inventors: Hai-Han Wang, Taipei City (TW); Chia-Hung Wei, Taipei City (TW)

(73) Assignee: SHARP KABUSHIKI KAISHA, Sakai City (JP)

(*) Notice: Subject to any disclaimer, the term of this patent is extended or adjusted under 35 U.S.C. 154(b) by 823 days.

(21) Appl. No.: 18/307,023

(22) Filed: Apr. 26, 2023

(65) Prior Publication Data

US 2023/0354367 A1 Nov. 2, 2023

Related U.S. Application Data

(60) Provisional application No. 63/335,502, filed on Apr. 27, 2022.

(51) Int. Cl.
*H04W 72/232* (2023.01)
*H04W 72/12* (2023.01)

(52) U.S. Cl.
CPC ......... *H04W 72/232* (2023.01); *H04W 72/12* (2013.01)

(58) Field of Classification Search
None
See application file for complete search history.

(56) References Cited

U.S. PATENT DOCUMENTS

| | | | | |
|---|---|---|---|---|
| 9,844,030 | B2 * | 12/2017 | Kim | H04L 5/0053 |
| 2022/0053522 | A1 * | 2/2022 | MolavianJazi | H04W 72/0453 |
| 2022/0346131 | A1 * | 10/2022 | Shi | H04L 5/0078 |
| 2023/0070761 | A1 * | 3/2023 | Kim | H04W 72/23 |

FOREIGN PATENT DOCUMENTS

| | | |
|---|---|---|
| WO | 2021066311 | 4/2021 |
| WO | 2022027561 | 2/2022 |
| WO | 114157397 | 3/2022 |

OTHER PUBLICATIONS

Zte, "On PDCCH enhancements for NR URLLC", 3GPP TSG RAN WG1 #99 R1-1911963, Nov. 18-22, 2019, pp. 1-14.
"Written Opinion of the International Searching Authority (Form PCT/ISA/237) of PCT/CN2023/090988," mailed on May 24, 2023, pp. 1-4.
"International Search Report (Form PCT/ISA/210) of PCT/CN2023/090988," mailed on May 24, 2023, pp. 1-3.

* cited by examiner

*Primary Examiner* — Srinivasa R Reddivalam
(74) *Attorney, Agent, or Firm* — ScienBiziP, P.C.

(57) ABSTRACT

Embodiments of the disclosure provide a method for configuring downlink control information (DCI) monitoring and a terminal device. The method includes: receiving, a radio resource control (RRC) signal, wherein the RRC signal indicates a specific DCI format is configured, the specific DCI format schedules a plurality of first shared channels of a plurality of cells, and each of the plurality of cells is associated with a DCI size budget; selecting a single specific cell from the plurality of cells based on the RRC signal; receiving DCI formats and accordingly perform a blind detection, the blind detection involves performing a DCI size alignment on the DCI formats associated with a reference cell of the plurality of cells based on the DCI size budget associated with the reference cell in response to determining that the DCI size budget associated with the reference cell is not met.

17 Claims, 7 Drawing Sheets

```
ue-Specific                              SEQUENCE {
            dci-Formats                          ENUMERATED {formats0-0-And-1-
0, formats0-1-And-1-1},
            ...,
            [[
            dci-Formats-MT-r16                ENUMERATED {formats2-5}
OPTIONAL,   -- Need R
            dci-FormatsSL-r16                 ENUMERATED {formats0-0-And-1-0,
formats0-1-And-1-1, formats3-0, formats3-1,
                                                                 formats3-0-And-3-1}
OPTIONAL,   -- Need R
            dci-FormatsExt-r16                ENUMERATED {formats0-2-And-1-2,
formats0-1-And-1-1And-0-2-And-1-2}
            dci-FormatsExt-r18                ENUMERATED {formats0-3-And-1-3}

OPTIONAL    -- Need R
            ]]
        }
```

FIG. 4

```
CrossCarrierSchedulingConfig ::=        SEQUENCE {
    schedulingCellInfo                      CHOICE {
        own                                     SEQUENCE {                  -- Cross
carrier scheduling: scheduling cell
            cif-Presence                            BOOLEAN
        },
          other                                 SEQUENCE {                  -- Cross
carrier scheduling: scheduled cell
            schedulingCellId                        ServCellIndex,
            cif-InSchedlingCell                     INTEGER (1..7)
        }
    schedulingCellInfo-r18                      CHOICE {
          own                                   SEQUENCE {                  -- Cross
carrier scheduling: scheduling cell
            cif-selfSchedule                            INTEGER (1..7)
        },
        other                                 SEQUENCE {                  -- Cross
carrier scheduling: scheduled cell
            schedulingCellId                        ServCellIndex,
            cif-selfSchedule                            INTEGER (1..7)
        }
    },
```

FIG. 5

METHOD FOR CONFIGURING DOWNLINK CONTROL INFORMATION MONITORING AND TERMINAL DEVICE

CROSS-REFERENCE TO RELATED APPLICATION(S)

The present application claims the benefit of and priority to U.S. Provisional Patent Application Ser. No. 63/335,502, filed on Apr. 27, 2022, entitled "PDCCH MONITORING FOR MULTIPLE CELLS", the content of which is hereby incorporated fully by reference herein into the present disclosure.

FIELD

The present disclosure generally relates to wireless communications, and more particularly, to a method for configuring downlink control information (DCI) monitoring and a terminal device.

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

In current NR specification, the scheduling mechanism only allows scheduling of single cell PUSCH/PDSCH per a scheduling DCI. Thus, when carrier aggregation (CA) is configured for a UE, if a gNB wants to schedule PUSCH/PDSCH transmission on more than one cell for the UE, multiple scheduling DCIs (downlink control information) needs to be used for the scheduling, which may result in overhead of control signaling. To reduce the control overhead, it is beneficial to extend from single-cell scheduling to multi-cell PUSCH/PDSCH scheduling with a single scheduling DCI.

In NR, a DCI is transmitted via PDCCH by a gNB to a UE using one or more control channel elements (CCE) contained in a CORESET. Configurations of a CORESET include configuration of the PRBs of which the frequency domain resource is used for the CORESET and include configuration of the number of OFDM symbols that defines the time duration of the CORESET. One or more search spaces may be associated with a CORESET. A search space defines the occasions of the associated CORESET, and one occasion of the CORESET may be referred as a monitoring occasion. Configurations of a search space include configuration of the periodicity and time offset of the search space and configuration of the duration of the search space, i.e., the consecutive number of slots in which one or more monitoring occasions exist.

If duration is configured as one, there is only one slot in which monitoring occasion(s) exist in each period. Configurations of a search space also include configuration of the type of the search space, i.e., UE specific search space (USS) or common search space (CSS), and the DCI format(s) that are monitored in the search space.

Configurations of a search space also include configuration of the number of PDCCH candidates per aggregation level (AL). It is noted that a search space may also be referred as a search space set. After being configured with the CORESETs and the search spaces, the UE attempts to decode the PDCCH candidates based on the configurations, which is also referred as PDCCH monitoring.

In regards of DCI formats monitored in a search space, the possible combinations of DCI formats monitored in a UE specific search space is {DCI format 0_0, DCI format 1_0}, {DCI format 0_1, DCI format 1_1}, {DCI format 0_2, DCI format 1_2}, and {DCI format 0_1, DCI format 1_1, DCI format 0_2, DCI format 1_2}. It is noted that DCI format 0_0, DCI format 0_1, and DCI format 0_2 are used for scheduling PUSCH, while DCI format 1_0, DCI format 1_1, and DCI format 1_2 are used for scheduling PDSCH.

In regards of DCI size budget, depending on the configurations related to the DCI fields of the DCI formats, different DCI formats may have different sizes. Since separate decoding attempts are required to decode DCI formats with different sizes, a DCI size budget is defined to keep reasonable complexity for PDCCH monitoring. The DCI size budget is defined as: the total number of different DCI payload sizes configured to monitor is not more than 4 for the cell, and the total number of different DCI payload sizes with C-RNTI configured to monitor is not more than 3 for the cell.

To meet the DCI size budget, a procedure of DCI size alignment is performed to align the DCI sizes of some of the DCI formats for the cell, and the detail of the procedure is as follows.

The first step is to determine DCI size for DCI format 0_0 and DCI format 1_0 in CSS and align the size of DCI format 0_0 to the size of DCI format 1_0.

Next, determine DCI size for DCI format 0_0 and DCI format 1_0 in USS and append padding bits to one of the DCI format 0_1 and the DCI format 1_1 with smaller size to align the sizes of the two DCI formats.

After that, determine DCI size for DCI format 0_1 and DCI format 1_1, respectively. To distinguish these non-fallback DCI formats with the fallback DCI formats in USS, 1 bit is appended to DCI format 0_1 or DCI format 1_1 if the size of the DCI format is equal to the fallback DCI format.

After the sizes of the DCI formats are determined, the DCI size budget is checked. If there are more than four DCI sizes configured for a cell, the bitwidth of the FDRA field in DCI format 0_0 and DCI format 1_0 in USS is aligned to the bitwidth of the FDRA field in DCI format 0_0 and DCI format 1_0 in CSS.

If there are still more than 4 four DCI sizes configured for the cell, some padding bits is appended to one of the DCI format 0_1 and the DCI format 1_1 with smaller size to align the sizes of the two DCI formats. Since DCI format 0_2 and DCI format 1_2 are introduced in Rel-16, an additional step is added to the procedure for DCI size alignment to determine DCI sizes for DCI format 0_2 and DCI format 1_2 after obtaining DCI sizes for DCI format 0_1 and DCI format 1_1.

Similarly, an additional step is added to the procedure for DCI size alignment to align the sizes of DCI format 0_2 and DCI format 1_2 when the DCI size budget is not met. It is noted that the step is after the step to align the sizes of DCI format 0_0 and DCI format 1_0 in USS and before the step to align the sizes of DCI format 0_1 and DCI format 1_1 in USS.

In regards of cross carrier scheduling, A DCI transmitted in a first cell can be used to schedule a PDSCH or a PUSCH in a second cell. The first cell is also referred as the scheduling cell, and the second cell is also referred as the scheduled cell. To indicate the PDSCH or the PUSCH scheduled in the second cell, a carrier indicator field can be configured in DCI format 0_1, DCI format 1_1, DCI format 0_2, or DCI format 1_2 in the first cell, which indicates a value associated with the second cell.

The value of the carrier indicator field that is used to indicate the second cell is configured via the CrossCarrierSchedulingConfig IE in the ServingCellConfig IE for the second cell, and the serving cell index of the first cell is also indicated in the CrossCarrierSchedulingConfig IE.

It is noted that a scheduled cell can only have one scheduling cell, and a scheduled cell cannot be scheduled by itself. That is, if the UE is configured to monitor PDCCH in a first cell for scheduling a second cell, the UE is not configured to monitor PDCCH in the second cell. On the other hand, a scheduling cell cannot be scheduled by another scheduling cell. That is, if the UE is configured to monitor PDCCH in a first cell for scheduling a second cell, the UE is configured to monitor PDCCH in the first cell for scheduling the first cell, and the UE is not configured to monitor PDCCH in a third cell for scheduling the first cell.

To configure the search space in the scheduling cell for cross carrier scheduling a scheduled cell, configurations of a search space configured via SearchSpace IE in the scheduling cell is reused except for the number of PDCCH candidates for cross carrier scheduling.

Specifically, search space configuration is also configured via SearchSpace IE in the scheduled cell, but only two IEs, i.e., searchSpaceId IE and nrofCandidates IE, are included in the SearchSpace IE in the scheduled cell, wherein the searchSpaceId IE is used to indicate the ID of the search space in the scheduling cell that is used for cross carrier scheduling, and the nrofCandidates IE is used to indicated the number of PDCCH candidates that should be monitored in the search space in the scheduling cell for cross carrier scheduling the scheduled cell.

It is noted that in the present disclosure, PDCCH monitoring in a cell or scheduling in a cell is related to PDCCH candidates that are transmitted in the cell. On the other hand, PDCCH monitoring for a cell or scheduling for a cell is related to PDCCH candidates that are transmitted in the cell or PDCCH candidates that are transmitted in another cell which cross carrier schedules the cell.

In regards of CCE determination, for determination of the CCEs used for a PDCCH candidate with aggregation level L, the following formula is used. For a search space set s associated with CORESET p, the CCE indexes for aggregation level L corresponding to PDCCH candidate $m_{s,n_{CI}}$ of the search space set in slot $$n_{s,f}^{\mu}$$

for an active DL BWP of a serving cell corresponding to carrier indicator field value $n_{CI}$ are given by $$L\cdot\left\{\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\lfloor N_{CCE,p}/L\rfloor\right\}+i$$

where for any CSS, $$Y_{p,n_{s,f}^{\mu}}=0;$$

for a USS, $$Y_{p,n_{s,f}^{\mu}}=\left(A_p\cdot Y_{p,n_{s,f}^{\mu}-1}\right)\bmod D,$$

$Y_{p,-1}=n_{RNTI}\neq 0$, $A_p=39827$ for pmod3=0, $A_p=39829$ for pmod3=1, $A_p=39839$ for pmod3=2, and D=65537;

i=0, . . . , L−1;

$N_{CCE,p}$ is the number of CCEs, numbered from 0 to $N_{CCE,p}-1$, in CORESET p and, if any, per RB set;

$n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$;

$$m_{s,n_{CI}}=0,\cdots,M_{s,n_{CI}}^{(L)}-1,\text{ where }M_{s,n_{CI}}^{(L)}$$

is the number of PDCCH candidates the UE is configured to monitor for aggregation level L of a search space set s for a serving cell corresponding to $n_{CI}$;

for any CSS, $$CSS,\ M_{s,max}^{(L)}=M_{s,0}^{(L)};$$

for a USS, $$M_{s,max}^{(L)}$$

is the maximum of $$M_{s,n_{CI}}^{(L)}$$

over all configured $n_{CI}$ values for a CCE aggregation level L of search space set s;

the RNTI value used for $n_{RNTI}$ is the C-RNTI.

In regards of BD/CCE limit, to keep reasonable complexity for PDCCH monitoring, limits on the number of blind decodes and the number of non-overlapped CCEs for which channel estimation is performed are defined. For a UE not configured with CA, the limits on the number of blind decodes and the number of non-overlapped CCEs are shown in Table 1 and Table 2 respectively.

TABLE 1

| Maximum number $M_{PDCCH}^{max,slot,\mu}$ of monitored PDCCH candidates per slot for a DL BWP with SCS configuration $\mu \in \{0, 1, 2, 3\}$ for a single serving cell | |
|---|---|
| μ | Maximum number of monitored PDCCH candidates per slot and per serving cell $M_{PDCCH}^{max,slot,\mu}$ |
| 0 | 44 |
| 1 | 36 |
| 2 | 22 |
| 3 | 20 |

TABLE 2

| Maximum number $C_{PDCCH}^{max,slot,\mu}$ of non-overlapped CCEs per slot for a DL BWP with SCS configuration $\mu \in \{0, 1, 2, 3\}$ for a single serving cell | |
|---|---|
| μ | Maximum number of non-overlapped CCEs per slot and per serving cell $C_{PDCCH}^{max,slot,\mu}$ |
| 0 | 56 |
| 1 | 56 |
| 2 | 48 |
| 3 | 32 |

For a UE configured with CA, the number of cells or TRPs for which the UE can perform PDCCH monitoring can be indicated via UE capability signaling to the gNB if the number of cells or TRPs are larger than 4.

More specifically, the UE indicates pdcch-BlindDetectionCA when it is possible to configure $$N_{cells,0}^{DL} + N_{cells,1}^{DL}$$

DL cells to the UE with $$N_{cells,0}^{DL} >= 0\,DL$$

serving cells without multi-DCI based multi-TRP and $$N_{cells,1}^{DL} >= 0\,DL$$

serving cells with multi-DCI based multi-TRP such that $$N_{cells,0}^{DL} + R \cdot N_{cells,1}^{DL} > 4,$$

whereas R is reported by UE capability signaling.

If the UE does not report pdcch-BlindDetectionCA, the UE does not expect to be configured with DL cells to the UE such that $$N_{cells,0}^{DL} + R \cdot N_{cells,1}^{DL} > 4 \text{ with } N_{cells,0}^{DL} >= 0\ DL$$

serving cells without multi-DCI based multi-TRP and $$N_{cells,1}^{DL} >= 0\,DL$$

serving cells with multi-DCI based multi-TRP, whereas R is reported by UE capability signaling. The value range of R is {1, 2}, and is indicated through UE capability signalling.

The limits on the number of blind decodes $$M_{PDCCH}^{total,slot,\mu}$$

for scheduling cells with SCS configuration μ and the limits on the number of non-overlapped $$C_{PDCCH}^{total,slot,\mu}$$

for scheduling cells with SCS configuration μ are determined as follows. When $$\sum_{\mu=0}^{3} \left(N_{cells,0}^{DL,\mu} + \gamma \cdot N_{cells}^{DL,\mu}\right) \le N_{cells}^{cap},$$

$$M_{PDCCH}^{total,slot,\mu} = M_{PDCCH}^{max,slot,\mu} \text{ and } C_{PDCCH}^{total,slot,\mu} = C_{PDCCH}^{max,slot,\mu}$$

if the scheduling cell is from the $$N_{cells,0}^{DL,\mu}$$

downlink cells with SCS configuration μ and without multi-DCI based multi-TRP.

$$M_{PDCCH}^{total,slot,\mu} = \gamma \cdot M_{PDCCH}^{max,slot,\mu} \text{ and } C_{PDCCH}^{total,slot,\mu} = \gamma \cdot C_{PDCCH}^{max,slot,\mu}$$

if the scheduling cell is from the $$N_{cells,1}^{DL,\mu}$$

downlink cells with SCS configuration μ and with multi-DCI based multi-TRP.

$$N_{cells}^{cap} \text{ is } N_{cells,0}^{DL} + R \cdot N_{cells,1}^{DL}$$

if the UE does not provide pdcch-BlindDetectionCA, where $$N_{cells,0}^{DL} + N_{cells,1}^{DL}$$

is the number of configured downlink serving cells.

Otherwise, $$N_{cells}^{cap}$$

is the value of pdcch-BlindDetectionCA. The value of $\gamma$ to be applied is optionally configured by RRC, either $\gamma=1$ or reported value $\gamma=R$.

On the other hand, when $$\sum_{\mu=0}^{3}\left(N_{cells,0}^{DL,\mu}+\gamma\cdot N_{cells,1}^{DL,\mu}\right)>N_{cells}^{cap},\ M_{PDCCH}^{total,slot,\mu}=\left\lfloor N_{cells}^{cap}\cdot M_{PDCCH}^{max,slot,\mu}\cdot\left(N_{cells,0}^{DL,\mu}+\gamma\cdot N_{cells,1}^{DL,\mu}\right)\Big/\sum_{j=0}^{3}\left(N_{cells,0}^{DL,j}+\gamma\cdot N_{cells,1}^{DL,j}\right)\right\rfloor$$

PDCCH candidates or more than $$C_{PDCCH}^{total,slot,\mu}=\left\lfloor N_{cells}^{cap}\cdot C_{PDCCH}^{max,slot,\mu}\cdot\left(N_{cells,0}^{DL,\mu}+\gamma\cdot N_{cells,1}^{DL,\mu}\right)\Big/\sum_{j=0}^{3}\left(N_{cells,0}^{DL,j}+\gamma\cdot N_{cells,1}^{DL,j}\right)\right\rfloor$$

non-overlapped CCEs per slot on the active DL BWP(s) of scheduling cell(s) from the $$N_{cells,0}^{DL,\mu}+N_{cells,1}^{DL,\mu}$$

downlink cells.

The limits on the number of blind decodes and the number of non-overlapped CCEs for each scheduled cell is determined as follows.

For each scheduled cell from the $$N_{cells,0}^{DL,\mu}$$

downlink cells, the UE is not required to monitor on the active DL BWP with SCS configuration $\mu$ of the scheduling cell more than $$\min\left(M_{PDCCH}^{max,slot,\mu},\ M_{PDCCH}^{total,slot,\mu}\right)$$

PDCCH candidates or more than $$\min\left(C_{PDCCH}^{max,slot,\mu},\ C_{PDCCH}^{total,slot,\mu}\right)$$

non-overlapped CCEs per slot.

For each scheduled cell from the $$N_{cells,1}^{DL,\mu}$$

downlink cells, the UE is not required to monitor on the active DL BWP with SCS configuration $\mu$ of the scheduling cell more than $$\min\left(\gamma\cdot M_{PDCCH}^{max,slot,\mu},\ M_{PDCCH}^{total,slot,\mu}\right)$$

PDCCH candidates or more than $$\min\left(\gamma\cdot C_{PDCCH}^{max,slot,\mu},\ C_{PDCCH}^{total,slot,\mu}\right)$$

non-overlapped CCEs per slot $$\min\left(M_{PDCCH}^{max,slot,\mu},\ M_{PDCCH}^{total,slot,\mu}\right)$$

PDCCH candidates or more than $$\min\left(C_{PDCCH}^{max,slot,\mu},\ C_{PDCCH}^{total,slot,\mu}\right)$$

non-overlapped CCEs per slot for CORESETs with same coresetPoolIndex value (i.e., from the same TRP).

In regards of PDCCH overbook, In PCell or PSCell, Type-0 CSS, Type-OA CSS, Type-1 CSS, and Type-2 CSS may be configured, which requires a number of PDCCH blind decodes and a number of non-overlapped CCEs. To keep flexibility for configuration and scheduling for USS, it is allowed to configure search spaces that result in the number of blind decodes or the number of non-overlapped CCEs in a slot exceeds the limits as described above. It is noted that the limits can be exceeded only for scheduling PCell or PSCell. When the limits are exceeded in a slot, some search spaces may be dropped. That is, the UE only monitors the search spaces that are not dropped.

The principle of the procedure is that the CSSs are always monitored, and a USS with smaller search space ID is selected before a USS with larger search space ID. The procedure is stopped when it is determined that further selecting a USS would result in the limit on the number of blind decodes or the limit on the number of non-overlapped CCEs being exceeded.

To enable a DCI scheduling multiple cells, the DCI may include additional fields compared to existing DCI formats. The multiple cells may or may not include the cell in which the DCI is transmitted. The following issues may need to be resolved.

DCI size budget: to keep the same complexity for PDCCH monitoring, the existing DCI size budget should be kept. For a DCI scheduling multiple cells, how to count the corresponding DCI size towards the DCI size budget needs to be resolved.

PDCCH monitoring: to adapt to the dynamically changing traffic need, PDCCH monitoring for DCIs scheduling single cell should be enabled when PDCCH monitoring for DCIs scheduling multiple cells is configured.

BD/CCE limits: a DCI scheduling multiple cells may have larger size compared to existing DCI formats. To achieve the same BLER, the AL used for the DCI may be larger. In order to utilize a DCI scheduling multiple cells without sacrificing the scheduling flexibility, the definition of BD/CCE limits may need to be changed.

CCE determination: a DCI scheduling multiple cells may schedule the cell in which the DCI is transmitted. That is, it is possible that self-scheduling and cross carrier scheduling are achieved by the same DCI. How to determine the CCEs for the PDCCH candidates for DCIs scheduling multiple cells should be resolved. For example, whether the method for determining CCEs for self-scheduling or the method for determining CCEs for cross carrier scheduling should be used.

Search space configuration: a DCI scheduling multiple cells may cross carrier schedule multiple cells. How to configure the search space for the DCI using RRC signaling needs to be resolved.

SUMMARY

The present disclosure is directed to a method for configuring downlink control information (DCI) monitoring and a terminal device, which can be used to solve the above technical problem(s).

Embodiments of the disclosure provide a method for configuring downlink control information (DCI) monitoring, adapted to a terminal device, including: receiving, from a network device, a radio resource control (RRC) signal, wherein the RRC signal indicates a specific DCI format is configured, the specific DCI format schedules a plurality of first shared channels of a plurality of cells, and each of the plurality of cells is associated with a DCI size budget; selecting a single specific cell from the plurality of cells based on the RRC signal; receiving, from the network device, DCI formats and accordingly perform a blind detection, the blind detection involves performing a DCI size alignment on the DCI formats associated with a reference cell of the plurality of cells based on the DCI size budget associated with the reference cell in response to determining that the DCI size budget associated with the reference cell is not met, wherein the DCI formats comprises the specific DCI format, wherein in a first case where a first DCI format of the DCI formats is not the specific DCI format, the first DCI format is associated with a first cell of the plurality of cells in which a second shared channel is scheduled by the first DCI format, and in a second case where the first DCI format is the specific DCI format, the first DCI format is only associated with the single specific cell.

Embodiments of the disclosure provide a terminal device including a transceiver, one or more non-transitory computer-readable media, and a processor. The one or more non-transitory computer-readable media having computer-executable instructions embodied thereon. The processor is coupled to the transceiver and the computer-readable media and performs: controlling the transceiver to receive, from a network device, a radio resource control (RRC) signal, wherein the RRC signal indicates a specific DCI format, the specific DCI format schedules a plurality of first shared channels of a plurality of cells, and each of the plurality of cells is associated with a DCI size budget; selecting a single specific cell from the plurality of cells based on the RRC signal; controlling the transceiver to receive, from the network device, DCI formats and accordingly perform a blind detection, the blind detection involves performing a DCI size alignment on the DCI formats associated with a reference cell of the plurality of cells based on the DCI size budget associated with the reference cell in response to determining that the DCI size budget associated with the reference cell is not met, wherein the DCI formats comprises the specific DCI format, wherein in a first case where a first DCI format of the DCI formats is not the specific DCI format, the first DCI format is associated with a first cell of the plurality of cells in which a second shared channel is scheduled by the first DCI format, and in a second case where the first DCI format is the specific DCI format, the first DCI format is only associated with the single specific cell.

Embodiments of the disclosure provide a method for configuring downlink control information (DCI) monitoring, adapted to a network device, including: determining whether a specific DCI format is configured, wherein the specific DCI format schedules a plurality of first shared channels of a plurality of cells, and each of the plurality of cells is associated with a DCI size budget; in response to determining that the specific DCI format is configured, selecting a single specific cell from the plurality of cells; in response to determining that the DCI size budget associated with a reference cell of the plurality of cells is not met, aligning sizes of a plurality of DCI formats associated with the reference cell via performing a DCI size alignment on the DCI formats associated with the reference cell based on the associated DCI size budget, wherein the DCI formats comprises the specific DCI format, wherein in a first case where a first DCI format of the plurality of DCI formats is not the specific DCI format, the first DCI format is associated with a first cell of the plurality of cells in which a second shared channel is scheduled by the first DCI format, and in a second case where the first DCI format is the specific DCI format, the first DCI format is only associated with the single specific cell; transmitting the DCI formats with the aligned sizes and a radio resource control (RRC) signal to a terminal device, wherein the RRC signal indicates the specific DCI format is configured and a Carrier Indicator Field (CIF) value associated with the specific DCI format.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

FIG. 4 shows the new RRC IE according to an embodiment of the disclosure.

FIG. 5 shows a new IE included in CrossCarrierSchedulingConfig IE according to an embodiment of the disclosure.

DETAILED DESCRIPTION

Figure 1:
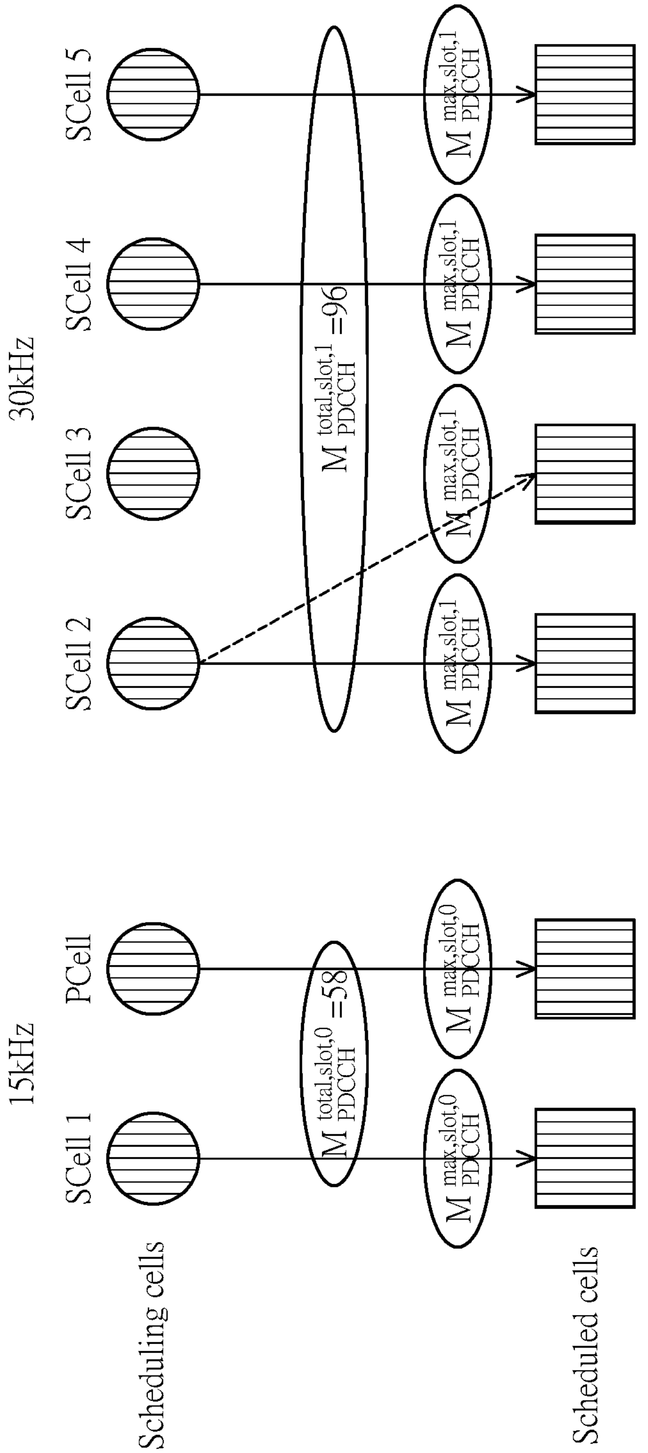
FIG. 1 shows the limits for scheduling cells and scheduled cells according to existing rules.

The acronyms in the present disclosure are defined as follows and unless otherwise specified, the acronyms have the following meanings:

| Acronym | Full name |
|---|---|
| 3GPP | $3^{rd}$ Generation Partnership Project |
| 5GC | 5G Core |
| ACK | Acknowledgement |
| ARQ | Automatic Repeat Request |
| BS | Base Station |
| BWP | Bandwidth Part |
| CA | Carrier Aggregation |
| CN | Core Network |
| CORESET | Control Resource Set |

-continued

| Acronym | Full name |
|---|---|
| C-RNTI | Cell-Radio Network Temporary Identifier |
| DC | Dual Connectivity |
| DCI | Downlink Control Information |
| DL | Downlink |
| HARQ | Hybrid Automatic Repeat Request |
| IE | Information Element |
| MAC | Medium Access Control |
| MCG | Master Cell Group |
| MIMO | Multiple Input Multiple Output |
| NG-RAN | Next-Generation Radio Access Network |
| NR | New Radio |
| NW | Network |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PRACH | Physical Random Access Channel |
| PUCCH | Physical Uplink Control Channel |
| PUSCH | Physical Uplink Shared Channel |
| RA | Random Access |
| RACH | Random Access Channel |
| RAN | Radio Access Network |
| Rel | Release |
| RLC | Radio Link Control |
| RNTI | Radio Network Temporary Identifier |
| RRC | Radio Resource Control |
| SCell | Secondary Cell |
| SCG | Secondary Cell Group |
| SCS | Sub Carrier Spacing |
| SDAP | Service Data Adaptation Protocol |
| SDU | Service Data Unit |
| SFN | System Frame Number |
| SI | System Information |
| TS | Technical Specification |
| UCI | Uplink Control Information |
| UE | User Equipment |
| UL | Uplink |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wide-band-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

In regards of DCI size budget, in the present disclosure, a DCI format scheduling multiple cells may be used for scheduling unicast PDSCH or unicast PUSCH. The CRC of the DCI format may be scrambled with C-RNTI, CS-RNTI, or MCS-C-RNTI.

In a first embodiment, a DCI format scheduling a first cell, a second cell, and a third cell is counted towards the DCI size budget for the first cell, the second cell, and the third cell.

In other words, assuming the DCI format is with size A, DCI formats with CRC scrambled by C-RNTI, CS-RNTI, or MCS-C-RNTI may be configured for scheduling the first cell with at most two sizes (e.g., size B and size C) different from size A, DCI formats with CRC scrambled by C-RNTI, CS-RNTI, or MCS-C-RNTI may be configured for scheduling the second cell with at most two sizes (e.g., size D and size E) different from size A, and DCI formats with CRC scrambled by C-RNTI, CS-RNTI, or MCS-C-RNTI may be configured for scheduling the third cell with at most two sizes (e.g., size F and size G) different from size A.

In one alternative, a DCI format scheduling a first cell, a second cell, and a third cell is counted towards the DCI size budget for one of the first cell, the second cell, and the third cell. In other words, assuming the DCI format is with size A and the DCI format is counted towards the DCI size budget for the first cell, DCI formats with CRC scrambled by C-RNTI, CS-RNTI, or MCS-C-RNTI may be configured for scheduling the first cell with at most two sizes (e.g., size B and size C) different from size A, DCI formats with CRC scrambled by C-RNTI, CS-RNTI, or MCS-C-RNTI may be configured for scheduling the second cell with at most three sizes (e.g., size D, size E, and size F) different from size A, and DCI formats with CRC scrambled by C-RNTI, CS-RNTI, or MCS-C-RNTI may be configured for scheduling the third cell with at most three sizes (e.g., size G, size H, and size I) different from size A.

The DCI format is counted towards the DCI size budget for which cell may be predefined or configured. For example, the DCI format may be counted towards the DCI size budget for the cell with lowest or highest serving cell index among the first cell, the second cell, and the third cell. For example, a RRC parameter may be used to configure that the DCI format is counted towards the DCI size budget for which cell. For example, the DCI format may be counted towards the DCI size budget for a cell in which the DCI format is transmitted if the cell is one of the first cell, the second cell, and the third cell. The alternative may provide more flexibility for configurations of DCI formats but may require higher UE complexity.

In one alternative, a DCI format scheduling a first cell, a second cell, and a third cell is counted towards the DCI size budget for more than one of the first cell, the second cell, and the third cell. In other words, assuming the DCI format is with size A and the DCI format is counted towards the DCI size budget for the second cell and the third cell, DCI formats with CRC scrambled by C-RNTI, CS-RNTI, or MCS-C-RNTI may be configured for scheduling the first cell with at most three sizes (e.g., size B, size C, and size D) different from size A, DCI formats with CRC scrambled by C-RNTI, CS-RNTI, or MCS-C-RNTI may be configured for scheduling the second cell with at most two sizes (e.g., size E, and size F) different from size A, and DCI formats with CRC scrambled by C-RNTI, CS-RNTI, or MCS-C-RNTI may be configured for scheduling the third cell with at most two sizes (e.g., size G, and size H) different from size A.

The DCI format is counted towards the DCI size budget for which cell may be predefined or configured. For example, the DCI format may be counted towards the DCI size budgets for the cells with lowest or highest serving cell indexes among the first cell, the second cell, and the third cell.

For example, a RRC parameter may be used to configure that the DCI format is counted towards the DCI size budget for which cells. For example, the DCI format may be counted towards the DCI size budget for all cells except for PCell or PSCell. Since PCell and PSCell may have Type-0 CSS, Type-OA CSS, Type-1 CSS, and Type-2 CSS, the example provides more flexibility for configurations of DCI formats for PCell and PSCell.

In a second embodiment, A step to align the sizes of DCI format 0_3 and DCI format 1_3 is added to the existing procedure of DCI size alignment as a last step. In other words, after aligning the sizes of DCI format 0_2 and DCI format 1_2, and aligning the sizes of DCI format 0_1 and DCI format 1_1, if the DCI size budget is still not met, the sizes of DCI format 0_3 and DCI format 1_3 is aligned, e.g., by padding zeros to one of DCI format 0_3 and DCI format 1_3 with smaller size until the two DCI format have the same size.

In regards of PDCCH monitoring, to enable PDCCH monitoring for DCIs scheduling single cell when PDCCH monitoring for DCIs scheduling multiple cells is configured, new DCI formats are used for DCIs scheduling multiple cells so that the UE can decode the existing DCI formats assuming a first DCI sizes, and decode the new DCI formats assuming a second DCI sizes. The first DCI sizes are determined based on a first RRC configurations related to the DCI fields of the existing DCI formats, and the second DCI sizes are determined based on a second RRC configurations related to the DCI fields of the new DCI formats. The new DCI format for scheduling multiple PDSCHs in multiple cells may be referred as DCI format 1_3, and the new DCI format for scheduling multiple PUSCHs in multiple cells may be referred as DCI format 0_3.

In a third embodiment, the new DCI formats are monitored in a SCell. Since the new DCI formats require larger AL, instead of transmitting the new DCI formats in PCell, transmitting the new DCI formats in a SCell with larger bandwidth and more resource for PDCCH compared to PCell would not affect the PDCCH monitoring in PCell which typically has smaller bandwidth and less resource for PDCCH. PCell can be scheduled by the new DCI formats. The SCell can be scheduled by the new DCI formats.

In one alternative, the new DCI formats are monitored in a PCell. The alternative is beneficial in terms of coverage since PCell is typically using a carrier with lower frequency. The alternative may be used when resource for PDCCH in PCell is enough to provide the larger AL.

In addition, under the current limits on the number of PDCCH candidates and number of non-overlapped CCEs for a scheduled cell, the available number of PDCCH candidates and the number of non-overlapped CCEs may not be enough for larger AL when considering the limits for PCell (if PCell is a scheduled cell), since some budget may be used by Type-0 CSS, Type-OA CSS, Type-1 CSS, and Type-2 CSS in PCell.

Therefore, to use the alternative, the limits may need to be redefined as described in the next sections. Alternatively, PCell should not be included as a scheduled cell by the new DCI formats.

To keep reasonable UE complexity, when the new DCI formats are monitored in a SCell and the new DCI formats schedules multiple cells including PCell, the UE may be configured to monitor DCI format 0_1, DCI format 1_1, DCI format 0_2, or DCI format 1_2 in PCell (for self-scheduling). Whether the UE can monitor DCI format 0_1, DCI format 1_1, DCI format 0_2, and DCI format 1_2 in PCell and monitor DCI format 0_3 and DCI format 1_3 in the SCell in overlapping symbols or in overlapping slots depends on the UE capability which is indicated to the gNB via UE capability signaling.

Similarly, when the new DCI formats are monitored in a SCell and the new DCI formats schedules multiple cells including a second SCell, the UE may be configured to monitor DCI format 0_1, DCI format 1_1, DCI format 0_2, or DCI format 1_2 in the second SCell (for self-scheduling). Whether the UE can monitor DCI format 0_1, DCI format 1_1, DCI format 0_2, and DCI format 1_2 in the second SCell and monitor DCI format 0_3 and DCI format 1_3 in the SCell in overlapping symbols or in overlapping slots depends on the UE capability which is indicated to the gNB via UE capability signaling.

In one alternative, the UE may be configured to monitor DCI format 0_1, DCI format 1_1, DCI format 0_2, or DCI format 1_2 in the second SCell only when the UE is not configured to monitor DCI format 0_1, DCI format 1_1, DCI format 0_2, or DCI format 1_2 in PCell in case the UE is configured to monitor DCI format 0_3 or DCI format 1_3 in the SCell scheduling multiple cells including PCell.

In a fourth embodiment, the DCI format(s) that may be configured to be monitored in a search space are {DCI format 0_3}, {DCI format 1_3}, and {DCI format 0_3, DCI format 1_3}. Since the number of simultaneous transmissions in different cells supported by the UE may be different for DL and UL, and the traffic may be DL heavy or UL heavy, it should be possible to monitor only the new DCI format for scheduling DL in a search space and/or to monitor only the new DCI format for scheduling UL in a search space.

In a fifth embodiment, to let search space configuration more flexible, PDCCH overbooking is allowed for a search space configured with the new DCI formats in PCell, and the new DCI formats schedules multiple cells including PCell. Search space dropping is based on the search space index as the existing procedure.

To avoid affecting the scheduling flexibility for other cells scheduled by the new DCI formats, gNB needs to configure other search spaces with DCI formats scheduling the other cells.

In other words, the UE expects to be configured with other search spaces with DCI formats scheduling cells other than PCell that can be scheduled by a DCI scheduling multiple cells if the search space containing the DCI scheduling multiple cells may be dropped as a result of PDCCH overbooking.

In one alternative, PDCCH overbooking is allowed for a search space configured with the new DCI formats in PCell, and the new DCI formats schedules multiple cells including PCell when the other cells scheduled by the new DCI formats are configured with other scheduling search spaces with existing DCI formats.

In a sixth embodiment, to provide scheduling flexibility based on the available PDCCH resource, more than one search space group may be configured. Each search space group may include one or more search spaces. For a cell that is configured with the new DCI formats, the search spaces that are configured with existing DCI formats and the search spaces that are configured with the new DCI formats may be configured in different search space groups.

Then, gNB may indicate the UE to switch the monitored search space group to a search space group including a search space configured with existing DCI formats when there are more available PDCCH resource, and gNB may indicate the UE to switch the monitored search space group to a search space group including a search space configured with the new DCI formats when there are less available PDCCH resource.

In regards of BD/CCE limits, To provide more BD and CCE budget for DCIs scheduling multiple cells without increasing UE complexity, the following method may be used. It is noted that the meaning of $$N_{cells,0}^{DL,\mu},\ N_{cells,1}^{DL,\mu},\ M_{PDCCH}^{max,slot,\mu_1},\ M_{PDCCH}^{total,slot,\mu_1},\ C_{PDCCH}^{max,slot,\mu_1},\ C_{PDCCH}^{total,slot,\mu_1},$$

and $\gamma$ are as described above unless stated otherwise.

In a first variation of a seventh embodiment, when the new DCI formats are monitored in a SCell and the new DCI formats schedules multiple cells including PCell, the UE may be configured to offload part of the processing power for PDCCH monitoring in PCell to be used for PDCCH monitoring in the SCell.

If PDCCH of active DL BWP of PCell is with SCS configuration $\mu_1$ and PDCCH of the SCell is with SCS configuration $\mu_2$, a scaling factor (e.g., $\alpha_1$) may be configured to define a limit on the number of PDCCH candidates and a limit on the number of non-overlapped CCEs for self-scheduling in PCell.

More specifically, the UE may expect PCell is one of the cells from the $$N_{cells,0}^{DL,\mu_1}$$

downlink cells, and the SCell is one of the cells from the $$N_{cells,0}^{DL,\mu_2}$$

downlink cells.

For self-scheduling PCell, the UE is not required to monitor on the active DL BWP with SCS configuration $\mu_1$ of PCell more than $$\alpha_1 \cdot \min\left(M_{PDCCH}^{max,slot,\mu_1},\ M_{PDCCH}^{total,slot,\mu_1}\right)$$

PDCCH candidates or more than $$\alpha_1 \cdot \min\left(C_{PDCCH}^{max,slot,\mu_1},\ C_{PDCCH}^{total,slot,\mu_1}\right)$$

non-overlapped CCEs per slot.

For cross carrier scheduling PCell and other cells via PDCCH in the SCell, the UE is not required to monitor more than $$(1-\alpha_1)\cdot\min\left(M_{PDCCH}^{max,slot,\mu_1},\ M_{PDCCH}^{total,slot,\mu_1}\right)$$

PDCCH candidates or more than $(1-\alpha_1)\cdot$ $$(1-\alpha_1)\cdot\min\left(C_{PDCCH}^{max,slot,\mu_1},\ C_{PDCCH}^{total,slot,\mu_1}\right)$$

non-overlapped CCEs per slot with SCS configuration $\mu_1$, plus $$\min\left(\beta_1\cdot M_{PDCCH}^{max,slot,\mu_2},\ M_{PDCCH}^{total,slot,\mu_2}\right)$$

PDCCH candidates or more than $$\min\left(\beta_1\cdot C_{PDCCH}^{max,slot,\mu_2},\ C_{PDCCH}^{total,slot,\mu_2}\right)$$

non-overlapped CCEs per slot with SCS configuration $\mu_2$, wherein $\beta_1$ may be a configured or a predefined value. The value of $\beta_1$ may be a non-integer.

For example, $\beta_1$ is equal to 2 if two cells besides PCell are scheduled by the new DCI formats, or $\beta_1$ is equal to 1 if one cell besides PCell is scheduled by the new DCI formats. $\beta_1$ may be defined or configured as 0 to reduce UE complexity for PDCCH monitoring.

In other words, the second bullet may not be applicable. When $\beta_1$ is equal to a non-integer value, e.g., 1.5, when two cells besides PCell are scheduled by the new DCI formats, more PDCCH resource can be provided for the new DCI formats compared to the case where $\beta_1$ is equal to 1, and more PDCCH resource can be saved for other cells not scheduled by the new DCI formats compared to the case where $\beta_1$ is equal to the number of cells that can be scheduled by the new DCI formats as in the above example.

For each of the multiple secondary cells scheduled from the SCell, the UE is not required to monitor more than min $$\left(\beta_2\cdot M_{PDCCH}^{max,slot,\mu_2},\ M_{PDCCH}^{total,slot,\mu_2}\right)$$

PDCCH candidates or more than $$\min\left(\beta_2\cdot C_{PDCCH}^{max,slot,\mu_2},\ C_{PDCCH}^{total,slot,\mu_2}\right)$$

non-overlapped CCEs per slot with SCS configuration $\mu_2$, wherein $\beta_2$ may be a configured or a predefined value, or $\beta_1$ may be reused for $\beta_2$.

It is assumed that PDCCH candidates for the new DCI formats are counted towards the BD/CCE limits for each scheduled cells scheduled from the SCell. It is noted that when $\beta_2$ is equal to 1, the BD/CCE limits are the same as the per scheduled cell BD/CCE limits according to existing rules. It can be seen that when $\beta_2$ is equal to 1, the number of PDCCH candidates and non-overlapped CCEs for scheduling a cell will be effectively reduced since PDCCH candidates for the new DCI formats are counted towards the BD/CCE limits for each scheduled cells. However, it would become a bottleneck when the required AL for the new DCI formats becomes large.

Figure 2:
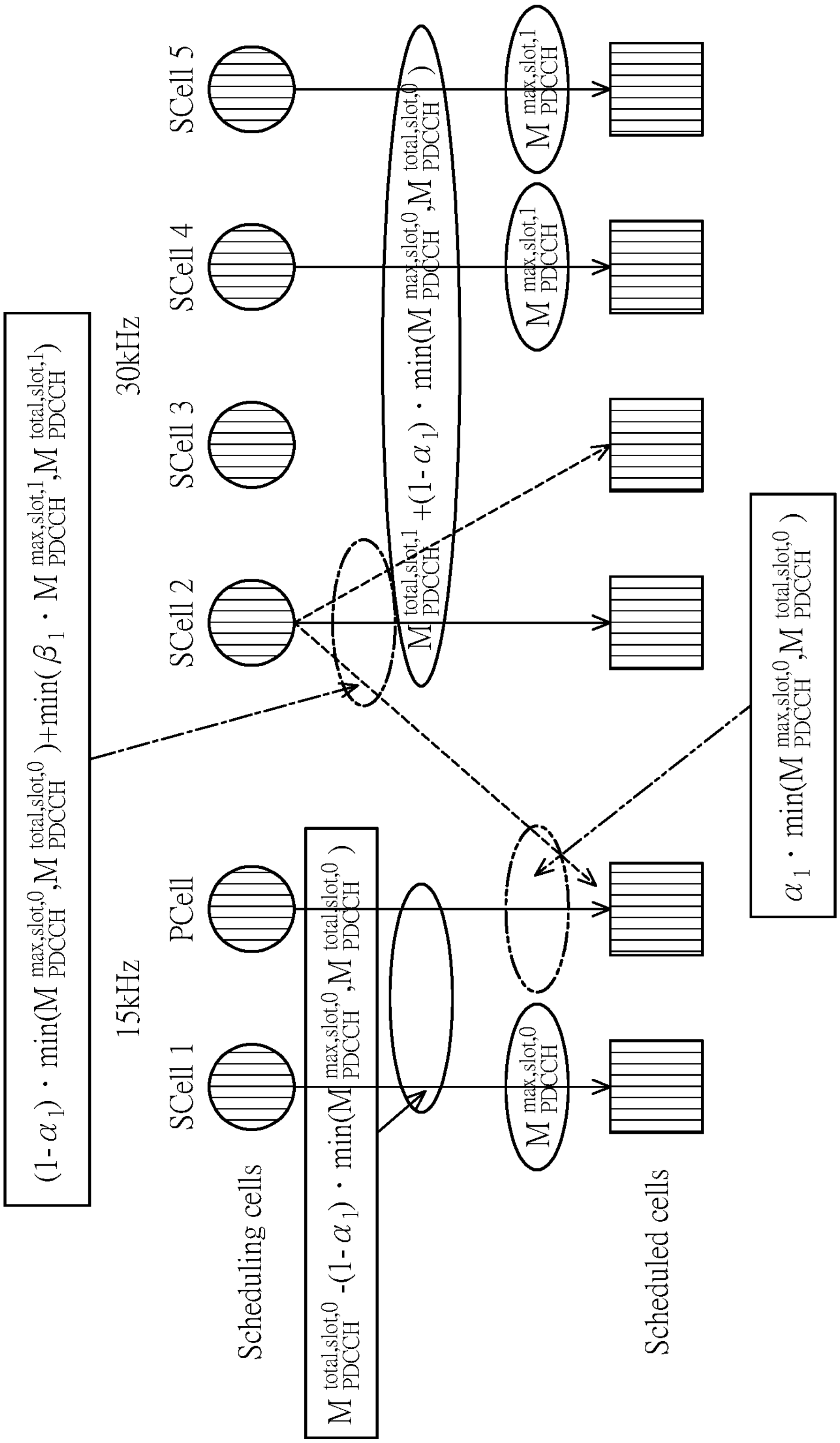
FIG. 2 shows the limits or scheduling cells and scheduled cells according to an embodiment of the disclosure.

FIG. 1 shows the limits for scheduling cells and scheduled cells according to existing rules. FIG. 2 shows the limits or scheduling cells and scheduled cells according to an embodiment of the disclosure. For the examples in FIG. 1 and FIG. 2, PCell is with 15 kHz SCS, SCell 1 is with 15 kHz SCS, and other 4 SCells are with 30 kHz SCS. pdcch-BlindDetectionCA is 4 for the example. Then, $$M_{PDCCH}^{total,slot,0}=\left\lfloor 4\cdot 44\cdot\frac{2}{6}\right\rfloor=58,\ M_{PDCCH}^{total,slot,1}=\left\lfloor 4\cdot 36\cdot\frac{4}{6}\right\rfloor=96,$$
$$C_{PDCCH}^{total,slot,0}=\left\lfloor 4\cdot 56\cdot\frac{2}{6}\right\rfloor=74,\text{ and }C_{PDCCH}^{total,slot,1}=\left\lfloor 4\cdot 56\cdot\frac{4}{6}\right\rfloor=149.$$

It is noted that only the limits on the number of blind decodes are shown in the figures.

For the example in FIG. 2, new DCI formats are configured to be monitored in SCell 2 which are used to scheduled PCell, SCell 2, and SCell 3. PCell is configured with at least common search spaces for self-scheduling. SCell 1, SCell 4, and SCell 5 are configured with UE specific search spaces for self-scheduling.

As shown in FIG. 2, the method increases the limits which can provide more PDCCH resource for the new DCI formats. The UE counts PDCCH candidates and non-overlapping CCEs that the UE monitors for the new DCI formats towards $$M_{PDCCH}^{total,slot,\mu_2}\text{ and }C_{PDCCH}^{total,slot,\mu_2},$$

respectively, and additional budgets $$\left(\text{i.e., }(1-\alpha_1)\cdot\min\left(M_{PDCCH}^{max,slot,\mu_1},\ M_{PDCCH}^{total,slot,\mu_1}\right),\ (1-\alpha_1)\cdot\min\left(C_{PDCCH}^{max,slot,\mu_1},\ C_{PDCCH}^{total,slot,\mu_1}\right)\right)$$

is added to the limits.

In one scenario, the multiple cells scheduled by the new DCI formats transmitted via the SCell includes a second SCell and the active DL BWP of the second SCell is with SCS configuration $\mu_3$. In the scenario, a second scaling factor (e.g., $\alpha_2$) may be configured to define a limit on the number of PDCCH candidates and a limit on the number of non-overlapped CCEs for self-scheduling the second SCell.

More specifically, the UE may expect the second SCell is one of the cells from the $$N_{cells,0}^{DL,\mu_3}$$

N cii downlink cells. For self-scheduling the second SCell, the UE is not required to monitor on the active DL BWP with SCS configuration $\mu_3$ of the second SCell more than $$\alpha_2\cdot\min\left(M_{PDCCH}^{max,slot,\mu_3},\ M_{PDCCH}^{total,slot,\mu_3}\right)$$

PDCCH candidates or more than $$\alpha_2 \cdot \min\left(C_{PDCCH}^{max,slot,\mu_3},\ C_{PDCCH}^{total,slot,\mu_3}\right)$$

non-overlapped CCEs per slot. For cross carrier scheduling PCell, the second SCell, and other cells via PDCCH in the SCell, the UE is not required to monitor more than $$(1-\alpha_1) \cdot \min\left(M_{PDCCH}^{max,slot,\mu_1},\ M_{PDCCH}^{total,slot,\mu_1}\right)$$

PDCCH candidates or more than (1−$\alpha_1$)·

$$(1-\alpha_1) \cdot \min\left(C_{PDCCH}^{max,slot,\mu_1},\ CM_{PDCCH}^{total,slot,\mu_1}\right)$$

non-overlapped CCEs per slot with SCS configuration $\mu_1$, plus $$(1-\alpha_2) \cdot \min\left(M_{PDCCH}^{max,slot,\mu_3},\ M_{PDCCH}^{total,slot,\mu_3}\right)$$

PDCCH candidates or more than $$(1-\alpha_2) \cdot \min\left(C_{PDCCH}^{max,slot,\mu_3},\ C_{PDCCH}^{total,slot,\mu_3}\right)$$

non-overlapped CCEs per slot with SCS configuration $\mu_3$, plus $$\min\left(\beta_1 \cdot M_{PDCCH}^{max,slot,\mu_2},\ M_{PDCCH}^{total,slot,\mu_2}\right)$$

PDCCH candidates or more than $$\min\left(\beta_1 \cdot C_{PDCCH}^{max,slot,\mu_2},\ C_{PDCCH}^{total,slot,\mu_2}\right)$$

non-overlapped CCEs per slot with SCS configuration $\mu_2$, wherein $\beta_1$ may be a configured or a predefined value. The value of $\beta_1$ may be a non-integer. For example, $\beta_1$ is equal to 2 if two cells besides PCell and the second SCell are scheduled by the new DCI formats, or $\beta_1$ is equal to 1 if one cell besides PCell and the second SCell is scheduled by the new DCI formats. $\beta_1$ may be defined or configured as 0 to reduce UE complexity for PDCCH monitoring. In other words, the third bullet may not be applicable.

When $\beta_1$ is equal to a non-integer value, e.g., 1.5, when two cells besides PCell are scheduled by the new DCI formats, more PDCCH resource can be provided for the new DCI formats compared to the case where $\beta_1$ is equal to 1, and more PDCCH resource can be saved for other cells not scheduled by the new DCI formats compared to the case where $\beta_1$ is equal to the number of cells that can be scheduled by the new DCI formats as in the above example.

For each of the multiple secondary cells scheduled from the SCell, the UE is not required to monitor more than $$\min\left(\beta_2 \cdot M_{PDCCH}^{max,slot,\mu_2},\ M_{PDCCH}^{total,slot,\mu_2}\right)$$

PDCCH candidates or more than $$\min\left(\beta_2 \cdot C_{PDCCH}^{max,slot,\mu_2},\ C_{PDCCH}^{total,slot,\mu_2}\right)$$

non-overlapped CCEs per slot with SCS configuration $\mu_2$, wherein $\beta_2$ may be a configured or a predefined value, or $\beta_1$ may be reused for $\beta_2$.

It is assumed that PDCCH candidates for the new DCI formats are counted towards the BD/CCE limits for each scheduled cells scheduled from the SCell. It is noted that when $\beta_2$ is equal to 1, the BD/CCE limits are the same as the per scheduled cell BD/CCE limits according to existing rules.

It can be seen that when $\beta_2$ is equal to 1, the number of PDCCH candidates and non-overlapped CCEs for scheduling a cell will be effectively reduced since PDCCH candidates for the new DCI formats are counted towards the BD/CCE limits for each scheduled cells. However, it would become a bottleneck when the required AL for the new DCI formats becomes large.

In one scenario, existing DCI formats are monitored in the SCell for scheduling PCell instead of the new DCI formats, e.g., when the search space group monitored by the UE is switched to a search space group not including a search space configured with the new DCI formats.

In the scenario, for cross carrier scheduling PCell via PDCCH in the SCell, the UE is not required to monitor more than $$(1-\alpha_1) \cdot \min\left(M_{PDCCH}^{\max,slot,\mu_1},\ M_{PDCCH}^{total,slot,\mu_1}\right)$$

PDCCH candidates or more than $$(1-\alpha_1) \cdot \min\left(C_{PDCCH}^{max,slot,\mu_1},\ C_{PDCCH}^{total,slot,\mu_1}\right)$$

non-overlapped CCEs per slot with SCS configuration $\mu_1$.

The UE counts PDCCH candidates and non-overlapping CCEs that the UE monitors for the new DCI formats towards $$M_{PDCCH}^{total,slot,\mu_1} \text{ and } C_{PDCCH}^{total,slot,\mu_1},$$

since the PDCCH processing power used for cross carrier scheduling PCell is solely from the PDCCH processing power shared from PCell.

When the new DCI formats are monitored in a SCell, PDCCH of the SCell is with SCS configuration $\mu_2$, and the new DCI formats schedules multiple cells not including PCell, $$M_{PDCCH}^{total,slot,\mu_2} \text{ and } C_{PDCCH}^{total,slot,\mu_2}$$

are determined based on existing rules. The UE is not required to monitor more than $$\min\left(\beta_2\cdot M_{PDCCH}^{max,slot,\mu_2},\ M_{PDCCH}^{total,slot,\mu_2}\right)$$

PDCCH candidates or more than $$\min\left(\beta_2\cdot C_{PDCCH}^{max,slot,\mu_2},\ C_{PDCCH}^{total,slot,\mu_2}\right)$$

non-overlapped CCEs per slot with SCS configuration $\mu_2$ for each of the multiple cells scheduled from the SCell, wherein $\beta_2$ may be a configured or a predefined value. It is assumed that PDCCH candidates for the new DCI formats are counted towards the BD/CCE limits for each scheduled cells scheduled from the SCell.

The value of $\beta_2$ may be a non-integer. For example, $\beta_2$ is equal to 3 if three cells are scheduled by the new DCI formats, or $\beta_2$ is equal to 2 if two cells are scheduled by the new DCI formats. $\beta_2$ may be defined or configured as 1 to reduce UE complexity for PDCCH monitoring. When $\beta_2$ is equal to a non-integer value, e.g., 1.5, when two cells are scheduled by the new DCI formats, more PDCCH resource can be provided for the new DCI formats compared to the case where $\beta_2$ is equal to 1, and more PDCCH resource can be saved for other cells not scheduled by the new DCI formats compared to the case where $\beta_2$ is equal to the number of cells that can be scheduled by the new DCI formats as in the above example. It is noted that when $\beta_2$ is equal to 1, the BD/CCE limits are the same as the per scheduled cell BD/CCE limits according to existing rules.

In a second variation of the seventh embodiment, when the new DCI formats are monitored in a SCell and the new DCI formats schedules multiple cells including PCell, the UE may be configured to offload part of the processing power for PDCCH monitoring in PCell to be used for PDCCH monitoring in the SCell.

If PDCCH of active DL BWP of PCell is with SCS configuration μ1 and PDCCH of the SCell is with SCS configuration $\mu_2$, scaling factors (e.g., $s_1$ and $s_2$) may be configured to define $$M_{PDCCH}^{total,slot,\mu_1} \Big/ C_{PDCCH}^{total,slot,\mu_1} \text{ and } M_{PDCCH}^{total,slot,\mu_2} \Big/ C_{PDCCH}^{total,slot,\mu_2},$$

respectively.

More specifically, the UE may expect PCell is one of the cells from the $$N_{cells,0}^{DL,\mu_1}$$

downlink cells, and the SCell is one of the cells from the $$N_{cells,0}^{DL,\mu_2}$$

downlink cells. For deriving $$M_{PDCCH}^{total,slot,\mu_1} \text{ and } C_{PDCCH}^{total,slot,\mu_1},$$

PCell is counted as $s_1$. It is noted that for deriving $$M_{PDCCH}^{total,slot,\mu_1}$$

and $$C_{PDCCH}^{total,slot,\mu_1}$$

as in legacy procedure, PCell is counted as 1.

For deriving $$M_{PDCCH}^{total,slot,\mu_2} \text{ and } C_{PDCCH}^{total,slot,\mu_2},$$

PCell is counted as $s_2$. It is noted that for deriving $$M_{PDCCH}^{total,slot,\mu_2} \text{ and } C_{PDCCH}^{total,slot,\mu_2}$$

as in legacy procedure, PCell is counted as 0.

For self-scheduling PCell, the UE is not required to monitor on the active DL BWP with SCS configuration $\mu_1$ of PCell more than min $$\left(s_1\cdot M_{PDCCH}^{max,slot,\mu_1},\ M_{PDCCH}^{total,slot,\mu_1}\right)$$

PDCCH candidates or more than min $$\left(s_1\cdot C_{PDCCH}^{max,slot,\mu_1},\ C_{PDCCH}^{total,slot,\mu_1}\right)$$

non-overlapped CCEs per slot.

For cross carrier scheduling PCell and other cells via PDCCH in the SCell, the UE is not required to monitor more than min $$\left((s_2+\beta_1)\cdot M_{PDCCH}^{max,slot,\mu_2},\ M_{PDCCH}^{total,slot,\mu_2}\right)$$

PDCCH candidates or more than $$\min\left((s_2+\beta_1)\cdot C_{PDCCH}^{max,slot,\mu_2},\ C_{PDCCH}^{total,slot,\mu_2}\right)$$

non-overlapped CCEs per slot with SCS configuration $\mu_2$, wherein $\beta_1$ may be a configured or a predefined value. The value of $\beta_1$ may be a non-integer. For example, $\beta_1$ is equal to 2 if two cells besides PCell are scheduled by the new DCI formats, or $\beta_1$ is equal to 1 if one cell besides PCell is scheduled by the new DCI formats. $\beta_1$ may be defined or configured as 0 to reduce UE complexity for PDCCH monitoring.

When $\beta_1$ is equal to a non-integer value, e.g., 1.5, when two cells besides PCell are scheduled by the new DCI formats, more PDCCH resource can be provided for the new DCI formats compared to the case where $\beta_1$ is equal to 1, and more PDCCH resource can be saved for other cells not scheduled by the new DCI formats compared to the case where $\beta_1$ is equal to the number of cells that can be scheduled by the new DCI formats as in the above example.

For each of the multiple secondary cells scheduled from the SCell, the UE is not required to monitor more than $$\min\left(\beta_2 \cdot M_{PDCCH}^{max,slot,\mu_2},\ M_{PDCCH}^{total,slot,\mu_2}\right)$$

PDCCH candidates or more than $$\min\left(\beta_2 \cdot C_{PDCCH}^{max,slot,\mu_2},\ C_{PDCCH}^{total,slot,\mu_2}\right)$$

non-overlapped CCEs per slot with SCS configuration $\alpha_2$, wherein $\beta_2$ may be a configured or a predefined value, or $\beta_1$ may be reused for $\beta_2$. It is assumed that PDCCH candidates for the new DCI formats are counted towards the BD/CCE limits for each scheduled cells scheduled from the SCell.

It is noted that when $\beta_2$ is equal to 1, the BD/CCE limits are the same as the per scheduled cell BD/CCE limits according to existing rules. It can be seen that when $\beta_2$ is equal to 1, the number of PDCCH candidates and non-overlapped CCEs for scheduling a cell will be effectively reduced since PDCCH candidates for the new DCI formats are counted towards the BD/CCE limits for each scheduled cells. However, it would become a bottleneck when the required AL for the new DCI formats becomes large.

Figure 3:
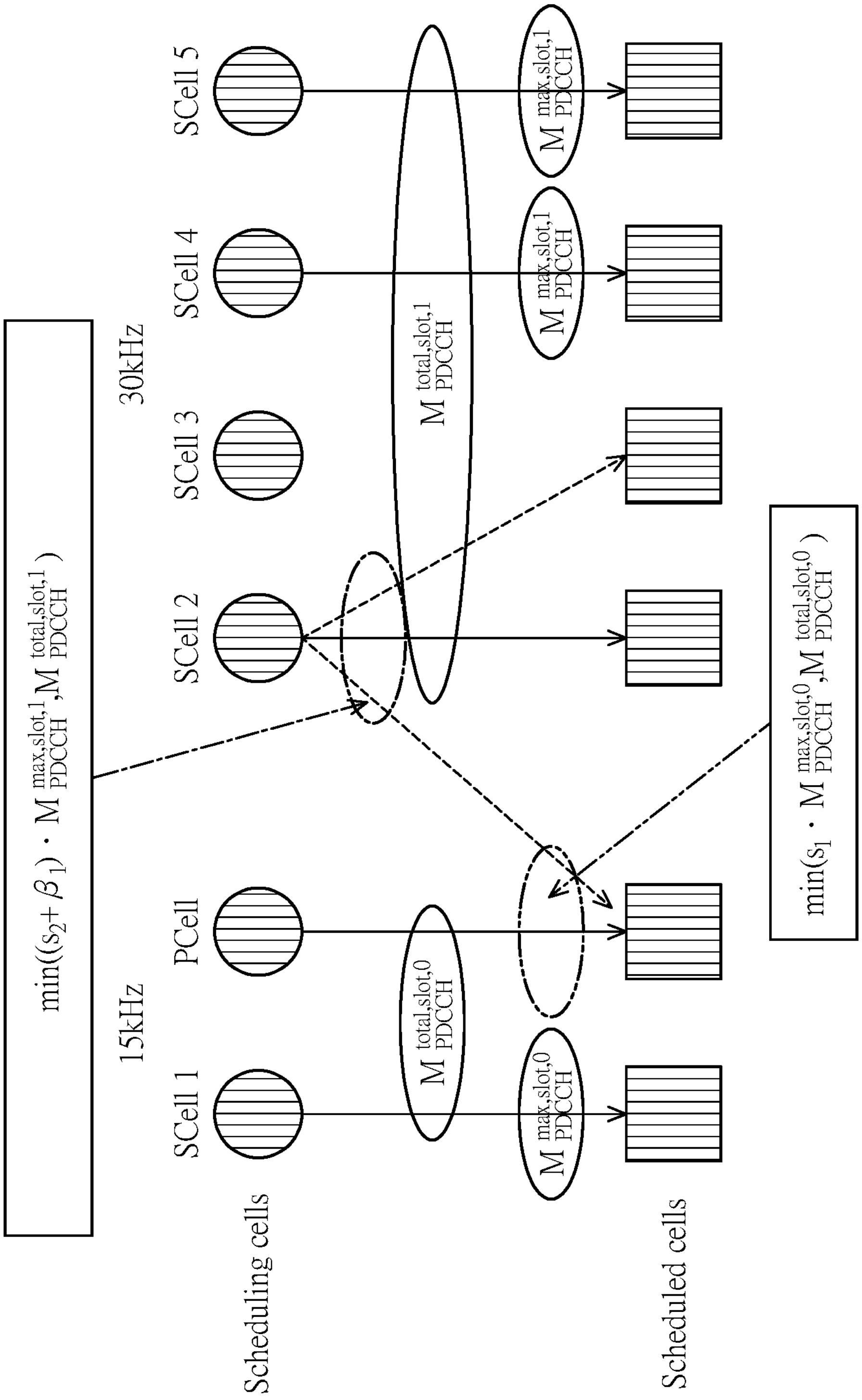
FIG. 3 shows the limits or scheduling cells and scheduled cells according to an embodiment of the disclosure.

FIG. 3 shows the limits or scheduling cells and scheduled cells according to the proposed methods. PCell is with 15 kHz SCS, SCell 1 is with 15 kHz SCS, and other 4 SCells are with 30 kHz SCS. pdcch-BlindDetectionCA is 4 for the example. Assume $s_1$=0.5, $s_2$=0.5, and $\beta_1$=2. Then, $$M_{PDCCH}^{total,slot,0} = \left\lfloor 4 \cdot 44 \cdot \frac{1+0.5}{6} \right\rfloor = 44,\ M_{PDCCH}^{total,slot,1} = \left\lfloor 4 \cdot 36 \cdot \frac{0.5+4}{6} \right\rfloor = 108,$$

$$C_{PDCCH}^{total,slot,0} = \left\lfloor 4 \cdot 56 \cdot \frac{1+0.5}{6} \right\rfloor = 56, \text{ and } C_{PDCCH}^{total,slot,1} = \left\lfloor 4 \cdot 56 \cdot \frac{0.5+4}{6} \right\rfloor = 168.$$

It is noted that only the limits on the number of blind decodes are shown in the figure. For the example in FIG. 3, new DCI formats are configured to be monitored in SCell 2 which are used to scheduled PCell, SCell 2, and SCell 3. PCell is configured with at least common search spaces for self-scheduling. SCell 1, SCell 4, and SCell 5 are configured with UE specific search spaces for self-scheduling.

As shown in FIG. 3, the method increases the limits which can provide more PDCCH resource for the new DCI formats. The UE counts PDCCH candidates and non-overlapping CCEs that the UE monitors for the new DCI formats towards $$M_{PDCCH}^{total,slot,\mu_2} \text{ and } C_{PDCCH}^{total,slot,\mu_2},$$

respectively.

In one scenario, the multiple cells scheduled by the new DCI formats transmitted via the SCell includes a second SCell and the active DL BWP of the second SCell is with SCS configuration $\mu_3$. In the scenario, scaling factors (e.g., $s_{11}$, $s_{12}$, $s_{33}$, and $s_{32}$) may be configured to define $$M_{PDCCH}^{total,slot,\mu_1} \Big/ C_{PDCCH}^{total,slot,\mu_1},\ M_{PDCCH}^{total,slot,\mu_2} \Big/ C_{PDCCH}^{total,slot,\mu_2},$$

$$\text{and } M_{PDCCH}^{total,slot,\mu_3} \Big/ C_{PDCCH}^{total,slot,\mu_3}.$$

More specifically, the UE may expect the second SCell is one of the cells from the $$N_{cells,0}^{DL,\mu_3}$$

downlink cells. For deriving $$M_{PDCCH}^{total,slot,\mu_1} \text{ and } C_{PDCCH}^{total,slot,\mu_1},$$

PCell is counted as so. It is noted that for deriving $$M_{PDCCH}^{total,slot,\mu_1} \text{ and } C_{PDCCH}^{total,slot,\mu_1},$$

as in legacy procedure, PCell is counted as 1. For deriving $$M_{PDCCH}^{total,slot,\mu_2} \text{ and } C_{PDCCH}^{total,slot,\mu_2},$$

PCell is counted as $s_{12}$. It is noted that for deriving $$M_{PDCCH}^{total,slot,\mu_2} \text{ and } C_{PDCCH}^{total,slot,\mu_2},$$

as in legacy procedure, PCell is counted as 0.

For deriving $$M_{PDCCH}^{total,slot,\mu_3} \text{ and } C_{PDCCH}^{total,slot,\mu_3},$$

the second SCell is counted as $s_{33}$. It is noted that for deriving $$M_{PDCCH}^{total,slot,\mu_3} \text{ and } C_{PDCCH}^{total,slot,\mu_3}$$

as in legacy procedure, the second SCell is counted as 1. For deriving $$M_{PDCCH}^{total,slot,\mu_3} \text{ and } C_{PDCCH}^{total,slot,\mu_2},$$

the second SCell is counted as $s_{32}$.

It is noted that for deriving $$M_{PDCCH}^{total,slot,\mu_2} \text{ and } C_{PDCCH}^{total,slot,\mu_2}$$

as in legacy procedure, the second SCell is counted as 0.

For self-scheduling the second SCell, the UE is not required to monitor on the active DL BWP with SCS configuration $\mu_3$ of the second SCell more than $$\min\left(s_{33}\cdot M_{PDCCH}^{max,slot,\mu_3},\ M_{PDCCH}^{total,slot,\mu_3}\right)$$

PDCCH candidates or more than $$\min\left(s_{33}\cdot C_{PDCCH}^{max,slot,\mu_3},\ C_{PDCCH}^{total,slot,\mu_3}\right)$$

non-overlapped CCEs per slot. For cross carrier scheduling PCell, the second SCell, and other cells via PDCCH in the SCell, the UE is not required to monitor more than $$\min\left((s_{12}+s_{32}+\beta_1)\cdot M_{PDCCH}^{max,slot,\mu_2},\ M_{PDCCH}^{total,slot,\mu_2}\right)$$

PDCCH candidates or more than $$\min\left((s_{12}+s_{32}+\beta_1)\cdot C_{PDCCH}^{max,slot,\mu_2},\ C_{PDCCH}^{total,slot,\mu_2}\right)$$

non-overlapped CCEs per slot with SCS configuration $\mu_2$, wherein $\beta_1$ may be a configured or a predefined value. The value of $\beta_1$ may be a non-integer.

For example, $\beta_1$ is equal to 2 if two cells besides PCell and the second SCell are scheduled by the new DCI formats, or $\beta_1$ is equal to 1 if one cell besides PCell and the second SCell is scheduled by the new DCI formats. $\beta_1$ may be defined or configured as 0 to reduce UE complexity for PDCCH monitoring. When $\beta_1$ is equal to a non-integer value, e.g., 1.5, when two cells besides PCell are scheduled by the new DCI formats, more PDCCH resource can be provided for the new DCI formats compared to the case where $\beta_1$ is equal to 1, and more PDCCH resource can be saved for other cells not scheduled by the new DCI formats compared to the case where $\beta_1$ is equal to the number of cells that can be scheduled by the new DCI formats as in the above example. For each of the multiple secondary cells scheduled from the SCell, the UE is not required to monitor more than $$\min\left(\beta_2\cdot M_{PDCCH}^{max,slot,\mu_2},\ M_{PDCCH}^{total,slot,\mu_2}\right)$$

PDCCH candidates or more than $$\min\left(\beta_2\cdot C_{PDCCH}^{max,slot,\mu_2},\ C_{PDCCH}^{total,slot,\mu_2}\right)$$

non-overlapped CCEs per slot with SCS configuration $\mu_2$, wherein $\beta_2$ may be a configured or a predefined value, or $\beta_1$ may be reused for $\beta_2$.

It is assumed that PDCCH candidates for the new DCI formats are counted towards the BD/CCE limits for each scheduled cells scheduled from the SCell. It is noted that when $\beta_2$ is equal to 1, the BD/CCE limits are the same as the per scheduled cell BD/CCE limits according to existing rules. It can be seen that when $\beta_2$ is equal to 1, the number of PDCCH candidates and non-overlapped CCEs for scheduling a cell will be effectively reduced since PDCCH candidates for the new DCI formats are counted towards the BD/CCE limits for each scheduled cells. However, it would become a bottleneck when the required AL for the new DCI formats becomes large.

In regards of CCE determination, the following method may be used to determine the CCEs used for PDCCH candidates for the new DCI formats.

In an eighth embodiment, for a search space s associated with CORESET p, the CCE indexes for aggregation level L corresponding to PDCCH candidate $m_{s,n_{CI}}$ of the search space in slot $$n_{s,f}^{\mu}$$

are given by $$L\cdot\left\{\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\lfloor N_{CCE,p}/L\rfloor\right\}+i$$

where $n_{CI}$ is equal to a value configured via a RRC IE (e.g., cif-InSchedulingCell) that is specifically for the new DCI formats as described in Method 9.

$$Y_{p,n_{s,f}^{\mu}}=\left(A_p\cdot Y_{p,n_{s,f}^{\mu}-1}\right)\bmod D,\ Y_{p,-1}=n_{RNTI}\neq 0,$$
$$A_p=39827\text{ for }p\bmod 3=0,\ A_p=39829\text{ for }p\bmod 3=1,$$
$$A_p=39839\text{ for }p\bmod 3=2,\text{ and }D=65537;$$

i=0, . . . , L−1;

$N_{CCE,p}$ is the number of CCEs, numbered from 0 to $N_{CCE,p}-1$, in CORESET p;

$$m_{s,n_{CI}}=0,\ \ldots,\ M_{s,n_{CI}}^{(L)}-1,\text{ where }M_{s,n_{CI}}^{(L)}$$

is the number of PDCCH candidates the UE is configured to monitor for aggregation level L of a search space set s for a serving cell corresponding to $n_{CI}$;

$$M_{s,max}^{(L)}$$

is the maximum of $$M_{s,n_{CI}}^{(L)}$$

over all configured $n_{CI}$ values for a CCE aggregation level L of search space s. In other words, other cells that is configured to be scheduled by existing DCI formats may be scheduled by the search space s;

the RNTI value used for $n_{RNTI}$ is the C-RNTI.

To enable the cells that are scheduled by the new DCI formats can also be scheduled by existing DCI formats, the CCEs used for PDCCH candidates for the existing DCI formats may be determined based on $n_{CI}$ values different from the $n_{CI}$ value for the new DCI formats.

For example, the $n_{CI}$ values used for determining the CCEs used for PDCCH candidates for the existing DCI formats may be the values configured via cif-InSchedulingCell in the configurations of the respective cells.

An example is given below with the following assumptions. A CORESET is with 3 symbols and 96 PRBs. Then, the number of CCEs in the CORESET is equal to 48. CORESET ID is equal to 2. C-RNTI is equal to 2. $n_{CI}$ is equal to 1 for cross-carrier scheduling only a first cell using existing DCI formats. $n_{CI}$ is equal to 2 for cross-carrier scheduling only a second cell using existing DCI formats. $n_{CI}$ is equal to 3 for cross-carrier scheduling only a third cell using existing DCI formats. $n_{CI}$ is equal to 4 for cross-carrier scheduling the first cell, the second cell, and the third cell using the new DCI formats.

The number of PDCCH candidates is equal to 8 for AL 2, equal to 4 for AL 4 for cross-carrier scheduling only the first cell, only the second cell, and only the third cell, respectively, using existing DCI formats.

The number of PDCCH candidates is equal to 4 for AL 8, equal to 2 for AL 16 for cross-carrier scheduling the first cell, the second cell, and the third cell using the new DCI formats.

$$\text{Then, } M_{s,max}^{(2)} = 9,\ M_{s,max}^{(4)} = 4,\ M_{s,max}^{(8)} = 4,\ M_{s,max}^{(16)} = 2$$

The CCE indexes of the PDCCH candidates for existing DCI formats for the first cell in the CORESET in slot 0 is calculated as the following.

The CCE indexes of the PDCCH candidates $m_{s,1}$={0, 1, . . . , 7} with AL 2:

$$2\cdot\left\{\left(14141+\left\lfloor\frac{m_{s,1}\cdot 48}{2\cdot 8}\right\rfloor+1\right)\bmod\lfloor 48/2\rfloor\right\}+\{0,1\}=\{12,13\},$$
$$\{18,19\},\{24,25\},\{30,31\},\{36,37\},\{42,43\},\{0,1\},\{6,7\}.$$

That is, the CCE indexes for the first PDCCH candidate is 12 and 13, the E indexes or the second PDCCH candidate is 18 and 19, and so on.

The CCE indexes of the PDCCH candidates $m_{s,1}$={0, 1, . . . , 3} with AL 4:

$$4\cdot\left\{\left(14141+\left\lfloor\frac{m_{s,1}\cdot 48}{4\cdot 4}\right\rfloor+1\right)\bmod\lfloor 48/4\rfloor\right\}+\{0,1,2,3\}=\{24,25,26,27\},$$
$$\{36,37,38,39\},\{0,1,2,3\},\{12,13,14,15\}.$$

The CCE indexes of the PDCCH candidates for existing DCI formats for the second cell in the CORESET in slot 0 is calculated as the following.

The CCE indexes of the PDCCH candidates $m_{s,1}$={0, 1, . . . , 7} with AL 2:

$$2\cdot\left\{\left(14141+\left\lfloor\frac{m_{s,1}\cdot 48}{2\cdot 8}\right\rfloor+2\right)\bmod\lfloor 48/2\rfloor\right\}+\{0,1\}=\{14,15\},$$
$$\{20,21\},\{26,27\},\{32,33\},\{38,39\},\{44,45\},\{2,3\},\{8,9\}.$$

The CCE indexes of the PDCCH candidates $m_{s,1}$ {0, 1, . . . , 3} with AL 4:

$$4\cdot\left\{\left(14141+\left\lfloor\frac{m_{s,1}\cdot 48}{4\cdot 4}\right\rfloor+2\right)\bmod\lfloor 48/4\rfloor\right\}+\{0,1,2,3\}=\{28,29,30,31\},$$
$$\{40,41,42,43\},\{4,5,6,7\},\{16,17,18,19\}.$$

The CCE indexes of the PDCCH candidates for existing DCI formats for the third cell in the CORESET in slot 0 is calculated as the following.

The CCE indexes of the PDCCH candidates $m_{s,1}$={0, 1, . . . , 7} with AL 2:

$$2\cdot\left\{\left(14141+\left\lfloor\frac{m_{s,1}\cdot 48}{2\cdot 8}\right\rfloor+3\right)\bmod\lfloor 48/2\rfloor\right\}+\{0,1\}=\{16,17\},$$
$$\{22,23\},\{28,29\},\{34,35\},\{40,41\},\{46,47\},\{4,5\},\{10,11\}.$$

The CCE indexes of the PDCCH candidates $m_{s,1}$={0, 1, . . . , 3} with AL 4:

$$4\cdot\left\{\left(14141+\left\lfloor\frac{m_{s,1}\cdot 48}{4\cdot 4}\right\rfloor+3\right)\bmod\lfloor 48/4\rfloor\right\}+\{0,1,2,3\}=\{28,29,30,31\},$$
$$\{40,41,42,43\},\{4,5,6,7\},\{16,17,18,19\}.$$

The CCE indexes of the PDCCH candidates for new DCI formats for scheduling the first cell, the second cell, and the third cell in the CORESET in slot 0 is calculated as the following.

The CCE indexes of the PDCCH candidates $m_{s,1}$={0, 1, . . . , 3} with AL 8:

$$8\cdot\left\{\left(14141+\left\lfloor\frac{m_{s,1}\cdot 48}{2\cdot 8}\right\rfloor+4\right)\bmod\lfloor 48/8\rfloor\right\}+\{0,1,2,3,4,5,6,7\}=$$
$$\{24,25,26,27,28,29,30,31\},\{32,33,34,35,36,37,38,39\},$$
$$\{0,1,2,3,4,5,6,7\},\{8,9,10,11,12,13,14,15\}.$$

The CCE indexes of the PDCCH candidates $m_{s,1}$={0, 1} with AL 16:

$$16\cdot\left\{\left(14141+\left\lfloor\frac{m_{s,1}\cdot 48}{4\cdot 4}\right\rfloor+4\right)\bmod\lfloor 48/16\rfloor\right\}+$$
$$\{0,1,2,3,4,5,6,7,8,9,10,11,12,13,14,15\}=$$
$$\{0,1,2,3,4,5,6,7,8,9,10,11,12,13,14,15\},$$
$$\{16,17,18,19,20,21,22,23,24,25,26,27,28,29,30,31\}.$$

To reduce the number of non-overlapped CCEs need for monitoring both the new DCI formats and existing DCI formats for a cell(s), gNB may configure that the CCE indexes for the existing DCI formats for the cell(s) are also derived based on the $n_{CI}$ configured for the new DCI formats scheduling the cell(s).

In this case, the value of the carrier indicator field (CIF) in the existing DCI formats are different from the value used for deriving the CCEs for the existing DCI formats.

Alternatively, the CCE indexes for the new DCI formats for the cell(s) may be configured to be derived based on the $n_{CI}$ configured for the existing DCI formats scheduling the cell(s). The methods may be applicable when the size of the new DCI formats are the same as the size of the existing DCI formats.

In regards of search space configuration, to configure a search space used for new DCI formats transmitted in a first cell which schedules a second cell, a third cell, and a fourth cell, existing RRC IEs in SearchSpace IE are reused in a ninth embodiment.

Additionally, the new DCI formats, e.g., DCI format 0_3 and DCI format 1_3 are indicated by a new RRC IE in the search space configuration of the search space in the first cell. For example, the new RRC IE may be the underlined RRC IE shown in FIG. 4.

The new DCI formats transmitted in a first cell may be used to schedule the first cell, a second cell, and a third cell. In other words, the new DCI format can also perform self-scheduling.

For configuring the carrier indicator field (CIF) value ($n_{CI}$) for the new DCI formats, a new IE (e.g., scheduling-CellInfo-r18) may be included in CrossCarrierScheduling-Config IE as shown in the example in FIG. 5.

In the example, the own IE is selected for schedulingCellInfo-r18 in a cell when the new DCI formats transmitted in the cell is also used to schedule the cell. In this case, the own IE can be used to indicate the carrier indicator field (CIF) value included in the new DCI formats.

One or more CIF values each associated with multiple cells may be configured. One cell should be associated with at most one CIF value used for multi-cell scheduling. For example, the new DCI formats transmitted in a first cell may be used to schedule the first cell, a second cell, and a third cell with CIF value equal to 1, and the new DCI formats transmitted in the first cell may be used to schedule a fourth cell, a fifth cell, and a sixth cell with CIF value equal to 2. The DCI fields with the same functions in the new DCI formats are associated with the multiple cells in increasing serving cell indexes.

To configure the number of PDCCH candidates for new DCI formats transmitted in a search space in a first cell which schedules a second cell, a third cell, and a fourth cell, a RRC IE (e.g., nrofCandidates) indicating a number of PDCCH candidates is included in search space configurations of each of the second cell, the third cell, and the fourth cell.

A RRC IE (e.g., searchSpaceId) indicating the search space ID of the search space in the first cell is included in search space configurations of each of the second cell, the third cell, and the fourth cell. A same number of PDCCH candidates is indicated in the configurations of the second cell, the third cell, and the fourth cell, which is determined as the number of PDCCH candidates for new DCI formats transmitted in the search space in the first cell. In one alternative, the number of PDCCH candidates for new DCI formats transmitted in the search space in the first cell is determined as the sum of the number of PDCCH candidates indicated in the configurations of the second cell, the third cell, and the fourth cell.

In one alternative, the number of PDCCH candidates for new DCI formats transmitted in the search space in the first cell is determined as the number of PDCCH candidates indicated in one of the configurations of the second cell, the third cell, and the fourth cell with smallest serving cell index. In one alternative, the number of PDCCH candidates for new DCI formats transmitted in the search space in the first cell is determined as the number of PDCCH candidates indicated in the configuration of the first cell.

Figure 6:
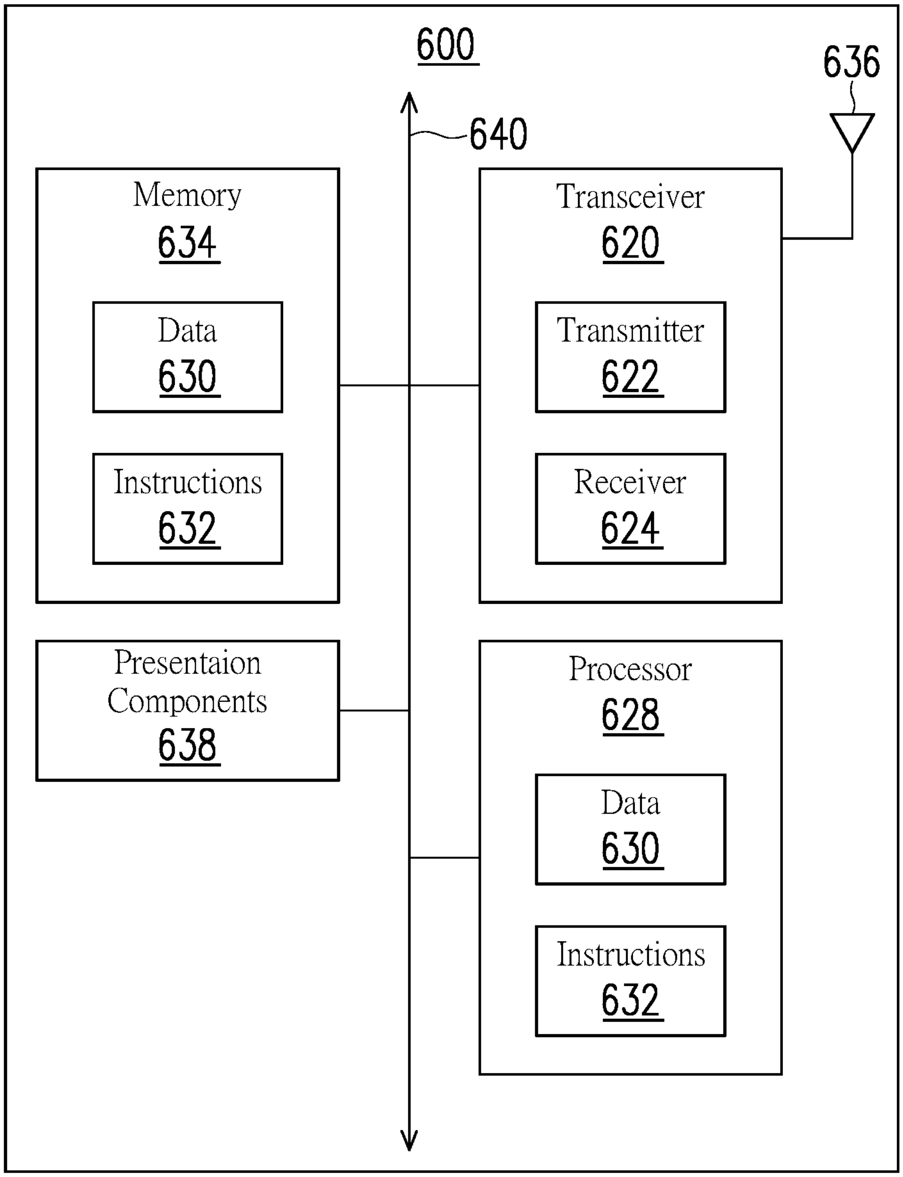
FIG. 6 illustrates a block diagram of a node for wireless communication, in accordance with various aspects of the present application.

FIG. 6 illustrates a block diagram of a node for wireless communication, in accordance with various aspects of the present application. As shown in FIG. 6, a node 600 may include a transceiver 620, a processor 628, a memory 634, one or more presentation components 638, and at least one antenna 636. The node 600 may also include an RF spectrum band module, a base station communications module, a network communications module, and a system communications management module, Input/Output (I/O) ports, I/O components, and power supply (not explicitly shown in FIG. 6). Each of these components may be in communication with each other, directly or indirectly, over one or more buses 640. In one implementation, the node 600 may be a UE or a base station that performs various functions described herein, for example, with reference to FIGS. 1 through 6-1.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media can be any available media that can be accessed by the node 600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 634 may include computer-storage media in the form of volatile and/or non-volatile memory. The memory 634 may be removable, non-removable, or a combination thereof. Exemplary memory includes solid-state memory, hard drives, optical-disc drives, and etc. As illustrated in FIG. 6, The memory 634 may store computer-readable, computer-executable instructions 632 (e.g., software codes) that are configured to, when executed, cause the processor 628 to perform various functions described herein, for example, with reference to FIGS. 1 through 6-1. Alternatively, the instructions 632 may not be directly executable by the processor 628 but be configured to cause the node 600 (e.g., when compiled and executed) to perform various functions described herein.

The processor 628 (e.g., having processing circuitry) may include an intelligent hardware device, e.g., a Central Processing Unit (CPU), a microcontroller, an ASIC, and etc. The processor 628 may include memory. The processor 628 may process the data 630 and the instructions 632 received from the memory 634, and information through the transceiver 620, the base band communications module, and/or the network communications module. The processor 628 may also process information to be sent to the transceiver 620 for transmission through the antenna 636, to the network communications module for transmission to a core network.

One or more presentation components 638 presents data indications to a person or other device. Exemplary presentation components 638 include a display device, speaker, printing component, vibrating component, and etc.

Figure 7:
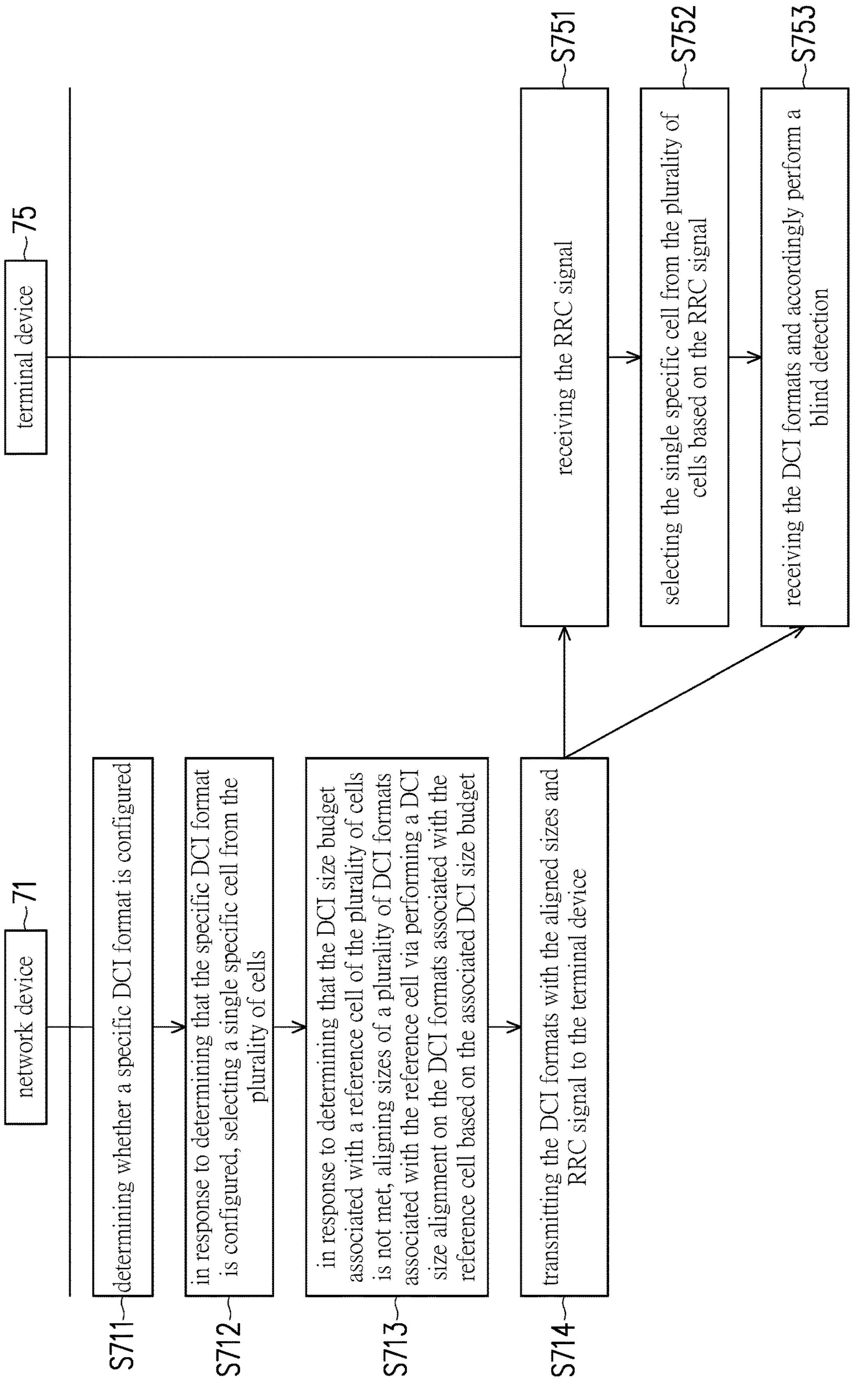
FIG. 7 shows a flow chart of the method for configuring DCI monitoring according to an embodiment of the disclosure.

See FIG. 7, which shows a flow chart of the method for configuring DCI monitoring according to an embodiment of the disclosure. The method of FIG. 7 can be carried out by a network device 71 and a terminal device 75, wherein the network device 71 can be a BS, and the terminal device 75 can be UE, but the disclosure is not limited thereto.

Firstly, in step S711, the network device 71 determines whether a specific DCI format is configured, wherein the specific DCI format schedules a plurality of first shared channels of a plurality of cells, and each of the plurality of cells is associated with a DCI size budget. In the embodiments of the disclosure, the specific DCI format can be the above-mentioned new DCI format, but the disclosure is not limited thereto.

In the embodiments of the disclosure, the plurality of cells include a plurality of serving cells where the terminal device 75 performs a carrier aggregation. In some embodiments, each of the first shared channels includes a PUSCH or a PDSCH, but the disclosure is not limited thereto.

In step S712, in response to determining that the specific DCI format is configured, the network device 71 selects a single specific cell from the plurality of cells. In the embodiments of the disclosure, the selected single specific cell can be any one of the plurality of cells.

In step S713, in response to determining that the DCI size budget associated with a reference cell of the plurality of cells is not met, the network device 71 aligns sizes of a plurality of DCI formats associated with the reference cell via performing a DCI size alignment on the DCI formats associated with the reference cell based on the associated DCI size budget, wherein the DCI formats include the specific DCI format. In the embodiments of the disclosure, the reference cell can be any one of the plurality of cells.

In a first case where one of the plurality of DCI formats (referred to as a first DCI format) is not the specific DCI format, the first DCI format is associated with a first cell of the plurality of cells in which a second shared channel is scheduled by the first DCI format. That is, when the first DCI format is not the new DCI format, the first DCI format would be considered in the procedure of the DCI size alignment of each of the plurality of cells.

In a second case where the first DCI format is the specific DCI format, the first DCI format is only associated with the single specific cell. That is, when the first DCI format is the new DCI format, the first DCI format would not be considered in the procedure of the DCI size alignment of other cells.

In the present disclosure, a DCI format scheduling multiple cells may be used for scheduling unicast PDSCH or unicast PUSCH. The CRC of the DCI format may be scrambled with C-RNTI, CS-RNTI, or MCS-C-RNTI.

In one embodiment, a DCI format scheduling cells C1 to C3 is counted towards the DCI size budget for one of the cells C1 to C3, wherein the cell C1 is assumed to be the single specific cell.

In this case, assuming that the specific DCI format is with size A and the DCI format is counted towards the DCI size budget for the cell C1, DCI formats with CRC scrambled by C-RNTI, CS-RNTI, or MCS-C-RNTI may be configured for scheduling the cell C1 with at most two sizes (e.g., size B and size C) different from size A. In addition, DCI formats with CRC scrambled by C-RNTI, CS-RNTI, or MCS-C-RNTI may be configured for scheduling the cell C2 with at most three sizes (e.g., size D, size E, and size F) different from size A. Similarly, DCI formats with CRC scrambled by C-RNTI, CS-RNTI, or MCS-C-RNTI may be configured for scheduling the cell C3 with at most three sizes (e.g., size G, size H, and size I) different from size A.

The DCI format is counted towards the DCI size budget for which cell may be predefined or configured. For example, the DCI format may be counted towards the DCI size budget for the cell with lowest or highest serving cell index among the cells C1 to C3.

For example, a RRC parameter may be used to configure that the DCI format is counted towards the DCI size budget for which cell. For example, the DCI format may be counted towards the DCI size budget for a cell in which the DCI format is transmitted if the cell is one of the cells C1 to C3. The alternative may provide more flexibility for configurations of DCI formats but may require higher UE complexity.

In one embodiment, the plurality of DCI format include a DCI format 0_2, a DCI format 1_2, a DCI format 0_1, a DCI format 1_1, a DCI format 0_3, a DCI format 1_3, wherein the DCI format 0_3 and DCI format 1_3 belong to the specific DCI format.

In one embodiment, the procedure of the network device 71 performing the DCI size alignment on the DCI formats associated with the reference cell based on the associated DCI size budget includes: aligning the sizes of the DCI format 0_2 and the DCI format 1_2 associated with the single specific cell and aligning the sizes of the DCI format 0_1 and the DCI format 1_1 associated with the single specific cell; in response to determining the DCI size budget of the single specific cell is not met, aligning the sizes of the DCI format 0_3 and the DCI format 1_3 associated with the single specific cell.

In one embodiment, aligning the sizes of the DCI format 0_3 and the DCI format 1_3 associated with the single specific cell includes padding zeros to one of the DCI format 0_3 and the DCI format 1_3 with a smaller size until the sizes of the DCI format 0_3 and the DCI format 1_3 are the same.

In one embodiment, the plurality of cells comprise the single specific cell and at least one other cell, and the size of the specific DCI format is not considered while performing the DCI size alignment on the DCI formats associated with the at least one other cell.

In step S714, the network device 71 transmits the DCI formats with the aligned sizes and RRC signal to the terminal device 75, wherein the RRC signal indicates the specific DCI format is configured and a CIF value associated with the specific DCI format.

In one embodiment, the RRC signal further indicates a Carrier Indicator Field (CIF) value associated with the specific DCI format. In one embodiment the CIF value may be $n_{CI}$ mentioned in the eighth embodiment, but the disclosure is not limited thereto.

In one embodiment, a specific information element is introduced into the RRC signal and indicates the CIF value, wherein the specific information element is defined in a search space configuration of the single specific cell. For example, the specific information element may be schedulingCellInfo-r18 included in CrossCarrierSchedulingConfig IE shown in FIG. 5, but the disclosure is not limited thereto.

In one embodiment, each of the plurality of cells corresponds to at most one CIF value.

In one embodiment, the plurality of cells include a plurality of first cells, the terminal device 75 is further configured with another specific DCI format scheduling other shared channels, and the first cells scheduled by the specific DCI format are different from the second cells scheduled by the another specific DCI format.

In one embodiment, the specific DCI format is monitored for at least one of a scheduling downlink (DL) in a first search space and a scheduling uplink (UL) in a second search space. For example, the DCI format(s) that may be configured to be monitored in a search space are {DCI format 0_3}, {DCI format 1_3}, and {DCI format 0_3, DCI format 1_3}. Since the number of simultaneous transmissions in different cells supported by the terminal device 71 may be different for DL and UL, and the traffic may be DL heavy or UL heavy, it should be possible to monitor only the new DCI format for scheduling DL in a search space and/or to monitor only the new DCI format for scheduling UL in a search space.

In one embodiment, after step S714, the terminal device 75 correspondingly receives the RRC signal in step S751 and selects the single specific cell from the plurality of cells based on the RRC signal.

In step S753, the terminal device 75 receives the DCI formats and accordingly perform a blind detection, wherein the blind detection involves performing the DCI size alignment on the DCI formats associated with a reference cell of the plurality of cells based on the DCI size budget associated with the reference cell in response to determining that the DCI size budget associated with the reference cell is not met.

In the first case where the first DCI format of the DCI formats is not the specific DCI format, the first DCI format is associated with the first cell of the plurality of cells in which a second shared channel is scheduled by the first DCI format.

In the second case where the first DCI format is the specific DCI format, the first DCI format is only associated with the single specific cell.

In the embodiments of the disclosure, how the terminal device 75 performs the DCI size alignment can be referred to the descriptions describing the mechanism of how the network device 71 performs the DCI size alignment.

In FIG. 7, although step S753 is illustrated after steps S751 and S752, in other embodiments, step S753 can be performed before steps S751 and S752 or performed at the same time of steps S751 and S752.

Based on the above, the embodiments of the disclosure provide solutions for dealing with at least one of the issues of DCI size budget, PDCCH monitoring, BD/CCE limits, CCE determination, and search space configuration.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a terminal device for downlink control information (DCI) monitoring, the method comprising:

receiving, from a network device, a radio resource control (RRC) signal that indicates to the terminal device that a first DCI format is configured, wherein the first DCI format schedules a plurality of first shared channels of a plurality of cells, and each of the plurality of cells is associated with a DCI size budget;

selecting a single specific cell from the plurality of cells based on the RRC signal;

receiving, from the network device, a plurality of DCI formats; and performing a blind detection based on the received plurality of DCI formats, wherein:

performing the blind detection comprises performing a DCI size alignment on the plurality of DCI formats associated with a reference cell of the plurality of cells based on the DCI size budget associated with the reference cell in response to the terminal device determining that the DCI size budget associated with the reference cell is not met, the plurality of DCI formats includes the first DCI format, a DCI format of the plurality of DCI formats that is not the first DCI format schedules a second shared channel of a first cell of the plurality of cells, first DCI format is associated with the single specific cell, the terminal device is further configured with a second DCI format that schedules other shared channels, and one or more cells of the plurality of cells that are scheduled by the first DCI format are different from one or more cells of the plurality of cells that are scheduled by the second DCI format.

2. The method according to claim 1, wherein the size of the first DCI format is not considered by the terminal device while performing the DCI size alignment on the plurality of DCI formats associated with the reference cell.

3. The method according to claim 1, wherein the plurality of cells, including the single specific cell, the first cell, and the reference cell, are serving cells in which the terminal device performs a carrier aggregation.

4. The method according to claim 1, wherein each of the plurality of first shared channels comprises a physical uplink shared channel (PUSCH) or a physical downlink shared channel (PDSCH).

5. The method according to claim 1, wherein the first DCI format is monitored by the terminal device for at least one of a scheduling downlink (DL) in a first search space and a scheduling uplink (UL) in a second search space.

6. The method according to claim 1, wherein the RRC signal further indicates a Carrier Indicator Field (CIF) value associated with the first DCI format.

7. The method according to claim 6, wherein a specific information element added to the RRC signal indicates the CIF value.

8. The method according to claim 7, wherein the specific information element is defined in a search space configuration of the single specific cell.

9. The method according to claim 1, wherein each of the plurality of cells corresponds to at most one CIF value.

10. A terminal device, comprising:

at least one processor; and at least one non-transitory computer-readable medium coupled to the at least one processor and storing one or more computer-executable instructions that, when executed by the at least one processor, cause the terminal device to:

receive, from a network device, a radio resource control (RRC) signal that indicates to the terminal device that a first DCI format is configured, wherein the first DCI format schedules a plurality of first shared channels of a plurality of cells, and each of the plurality of cells is associated with a DCI size budget;

select a single specific cell from the plurality of cells based on the RRC signal;

receive, from the network device, a plurality of DCI formats; and perform a blind detection based on the received plurality of DCI formats, wherein:

performing the blind detection comprises performing a DCI size alignment on the plurality of DCI formats associated with a reference cell of the plurality of cells based on the DCI size budget associated with the reference cell in response to the terminal device determining that the DCI size budget associated with the reference cell is not met, the plurality of DCI formats includes the first DCI format, a DCI format of the plurality of DCI formats that is not the first DCI format schedules a second shared channel of a first cell of the plurality of cells, the first DCI format is associated with the single specific cell, the terminal device is further configured with a second DCI format that schedules other shared channels, and one or more cells of the plurality of cells that are scheduled by the first DCI format are different from one or more cells of the plurality of cells that are scheduled by the second DCI format.

11. The terminal device according to claim 10, wherein the size of the first DCI format is not considered by the terminal device while performing the DCI size alignment on the plurality of DCI formats associated with the reference cell.

12. The terminal device according to claim 10, wherein the plurality of cells, including the single specific cell, the first cell, and the reference cell, are serving cells in which the terminal device performs a carrier aggregation.

13. The terminal device according to claim 10, wherein each of the plurality of first shared channels comprises a physical uplink shared channel (PUSCH) or a physical downlink shared channel (PDSCH).

14. The terminal device according to claim 10, wherein the first DCI format is monitored by the terminal device for at least one of a scheduling downlink (DL) in a first search space and a scheduling uplink (UL) in a second search space.

15. The terminal device according to claim 10, wherein the RRC signal further indicates a Carrier Indicator Field (CIF) value associated with the first DCI format.

16. The terminal device according to claim 15, wherein a specific information element added to the RRC signal indicates the CIF value.

17. The terminal device according to claim 10, wherein each of the plurality of cells corresponds to at most one CIF value.

* * * * *